(12) United States Patent
Holmes

(10) Patent No.: US 7,839,546 B2
(45) Date of Patent: Nov. 23, 2010

(54) SECURITY DEVICE USING PARALLAX MOVEMENT TO VIEW FRONT AND REAR LAYERS

(75) Inventor: Brian William Holmes, Hampshire (GB)

(73) Assignee: De La Rue International Limited, Hampshire (GB)

( * ) Notice: Subject to any disclaimer, the term of this patent is extended or adjusted under 35 U.S.C. 154(b) by 584 days.

(21) Appl. No.: 10/585,189

(22) PCT Filed: Jan. 13, 2005

(86) PCT No.: PCT/GB2005/000101

§ 371 (c)(1),
(2), (4) Date: Oct. 30, 2006

(87) PCT Pub. No.: WO2005/069085

PCT Pub. Date: Jul. 28, 2005

(65) Prior Publication Data

US 2007/0216975 A1    Sep. 20, 2007

(51) Int. Cl.
G03H 1/00 (2006.01)
G03H 1/22 (2006.01)
B42D 15/00 (2006.01)

(52) U.S. Cl. .............................. 359/2; 359/32; 359/33; 283/86

(58) Field of Classification Search ........................ None
See application file for complete search history.

(56) References Cited

U.S. PATENT DOCUMENTS

| | | | |
|---|---|---|---|
| 4,568,141 A * | 2/1986 | Antes | 359/2 |
| 5,447,335 A | 9/1995 | Haslop | |
| 5,694,229 A | 12/1997 | Drinkwater et al. | |
| 6,369,919 B1 | 4/2002 | Drinkwater et al. | |
| 6,765,704 B2 * | 7/2004 | Drinkwater | 359/2 |
| 2003/0151786 A1 | 8/2003 | Drinkwater | |
| 2004/0121241 A1 * | 6/2004 | Kodama | 430/1 |

FOREIGN PATENT DOCUMENTS

WO    WO 00/73991 A1    12/2000

OTHER PUBLICATIONS

Rhody et al.; "Holography Marketplace: $7^{th}$ Edition;" XP-002329256; pp. 24-25; 1998.

* cited by examiner

*Primary Examiner*—Stephone B Allen
*Assistant Examiner*—Jade R Chwasz
(74) *Attorney, Agent, or Firm*—Oliff & Berridge, PLC

(57) ABSTRACT

A security device including a surface relief microstructure which, in response to incident radiation, replays a hologram viewable within a viewing zone, the hologram including at least a first holographic image element in an image plane spaced from the surface of the microstructure. The device exhibits at least one further image in a plane spaced from the image plane of the first holographic element. On tilting the device, the first holographic image element exhibits apparent movement relative to the further image, which when expressed in radians, a rate of parallax movement per radian equals the spacing between phones and the product of the rate of movement and the included angle of the viewing zone defining a distance at least 20% of the dimension of the device in the direction of movement of the first holographic image element.

23 Claims, 26 Drawing Sheets

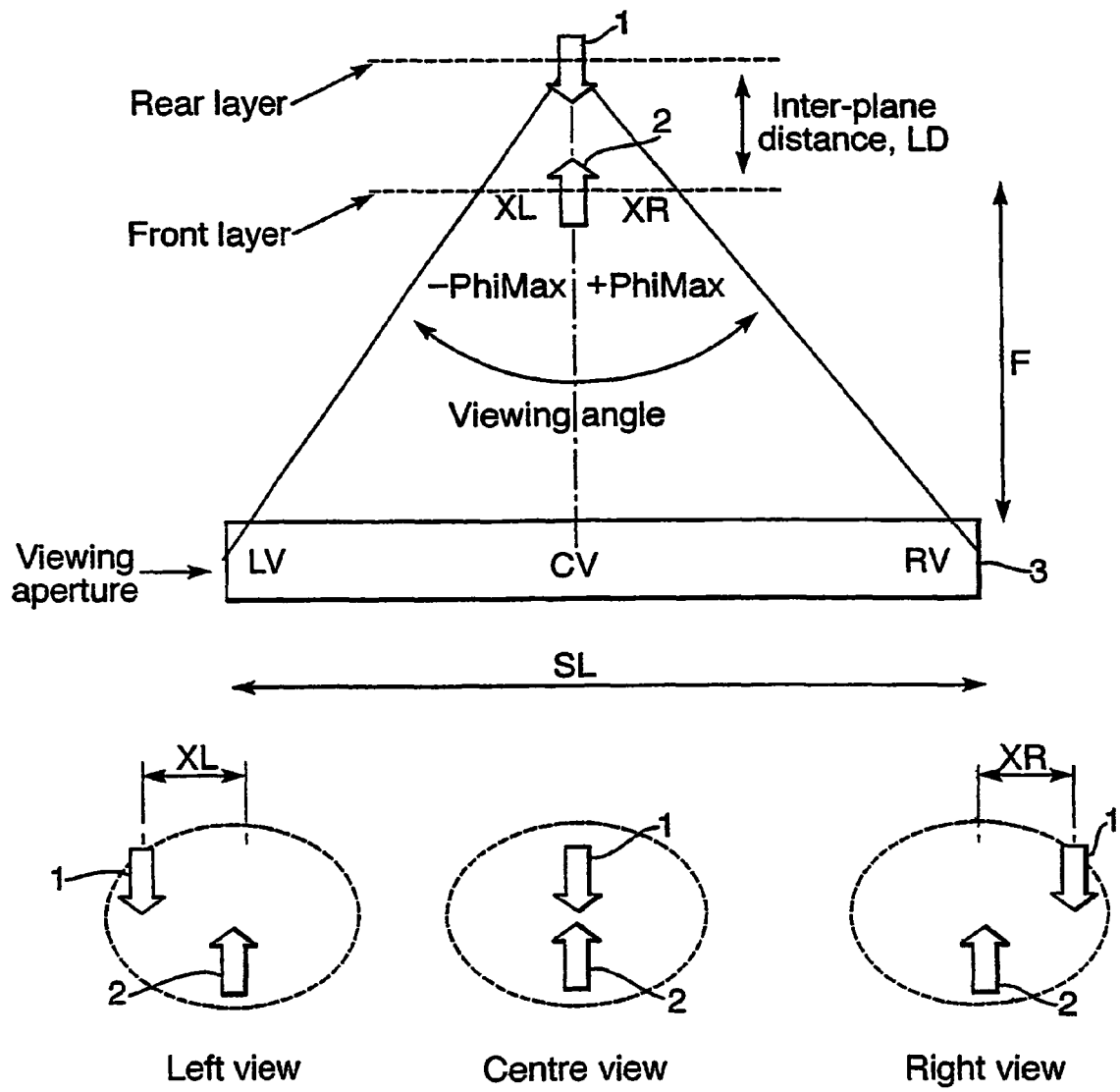

Holographic / diffractive OVD viewing geometry

Incident light

Red
Green
Blue | Holographic viewing window

Image

Zero order/reflected light

Plan view

PhiMax
Phi
LV      RV

Side view

Fig.9.

Visual showing parallax displacement and image smear under point source light

| Depth | Left | Centre | Right |
|---|---|---|---|
| 2mm | | | |
| 4mm | | | |
| 6mm | | | |
| 8mm | | | |

Fig.10.

Visual showing parallax displacement and image smear under extended light source

Fig.11.
Visual showing parallax motion viewed under point source with front plane datum effect
| Depth | Left | Centre | Right |
|---|---|---|---|
| 2mm | 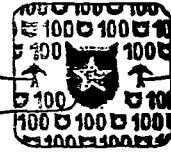 | 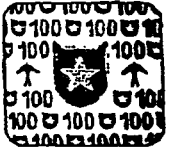 | 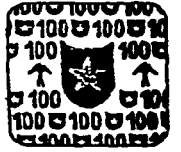 |
| 4mm |  |  |  |
| 6mm | 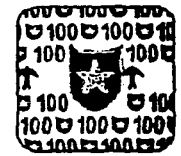 |  |  |
| 8mm |  | 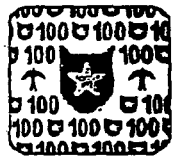 | 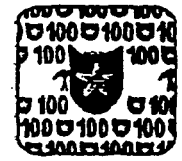 |

Fig. 12.
Visual showing parallax motion and blur viewd under extended light source
| Depth | Left | Centre | Right |
|---|---|---|---|
| 2mm | 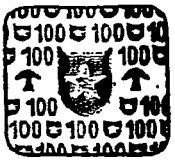 |  | 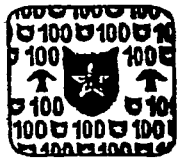 |
| 4mm |  |  |  |
| 6mm | 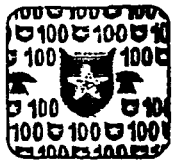 |  |  |
| 8mm |  |  |  |

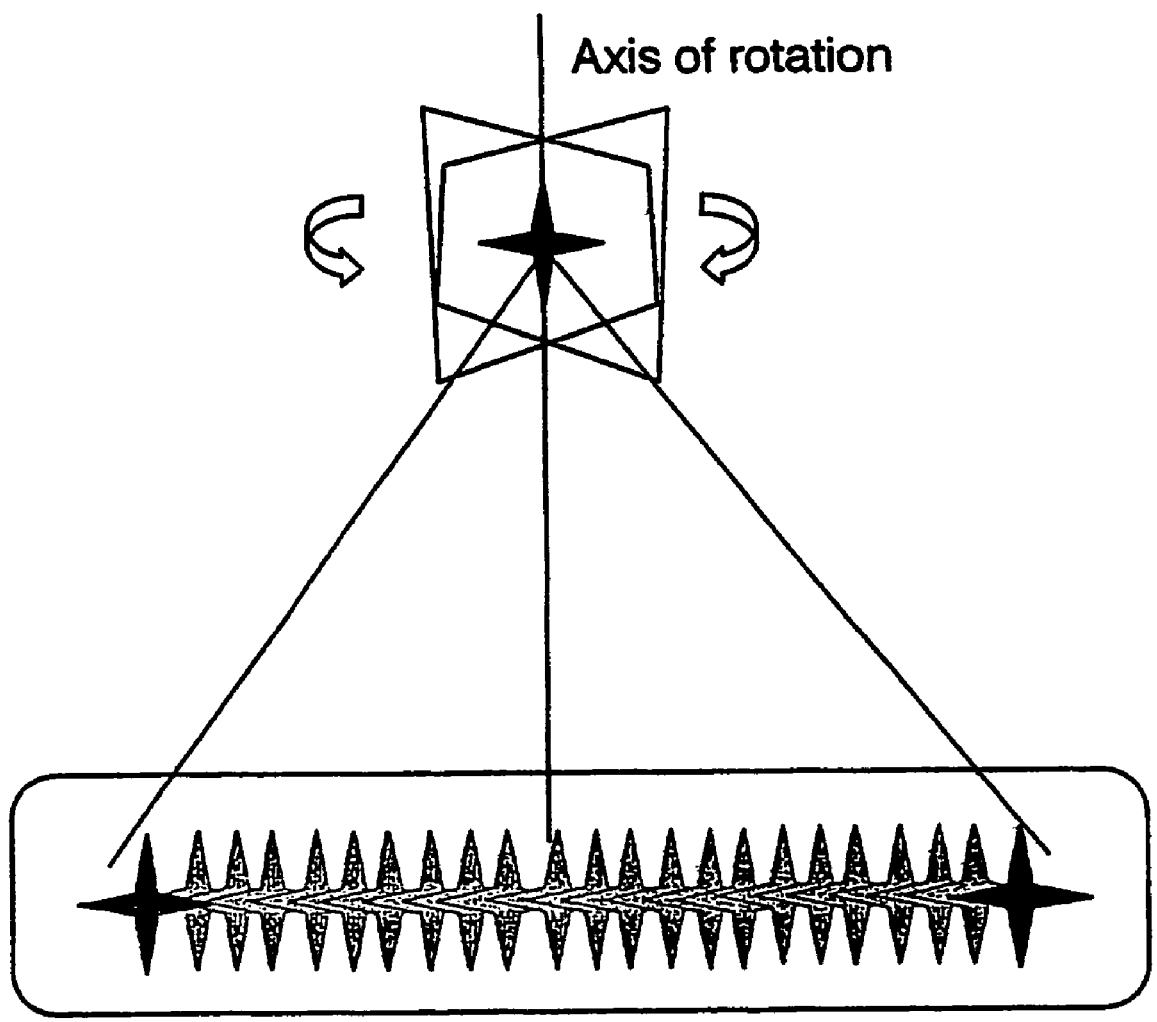

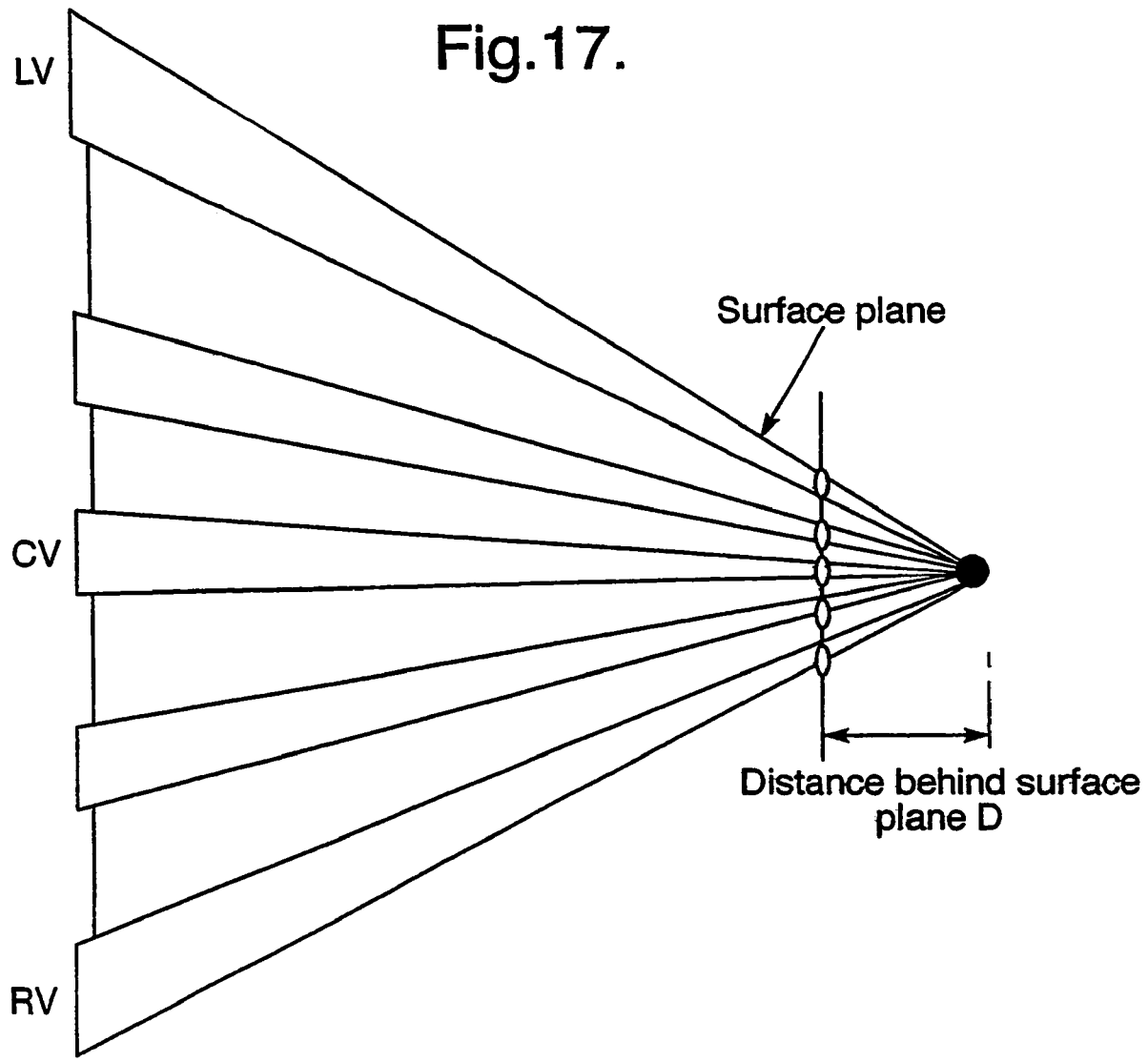

Fig.18. Axis of rotation
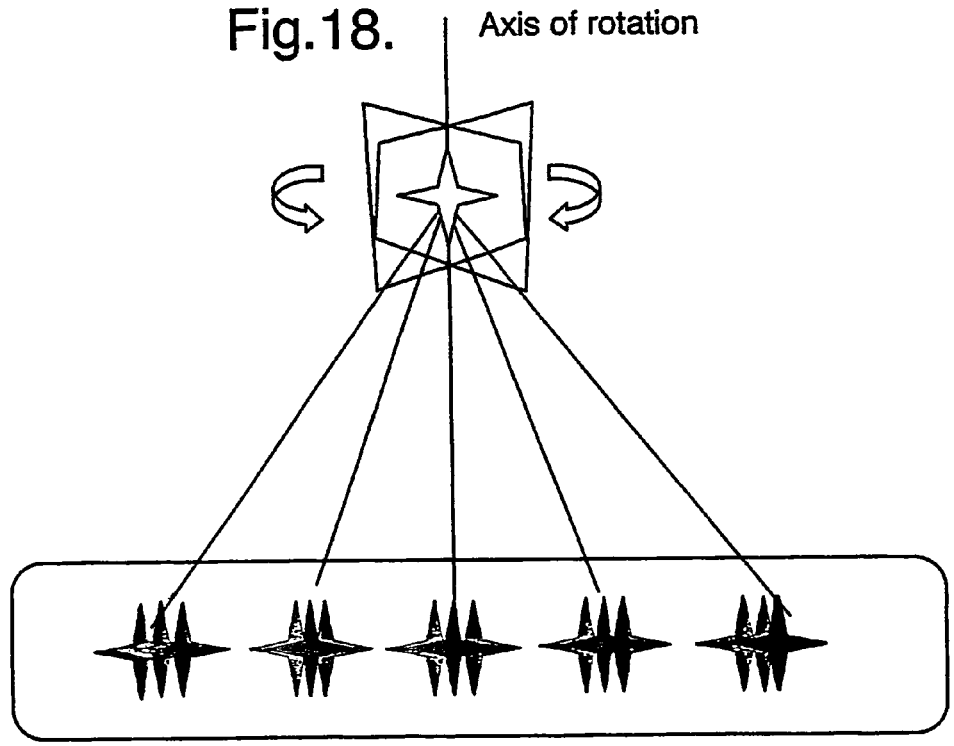
Fig.20.
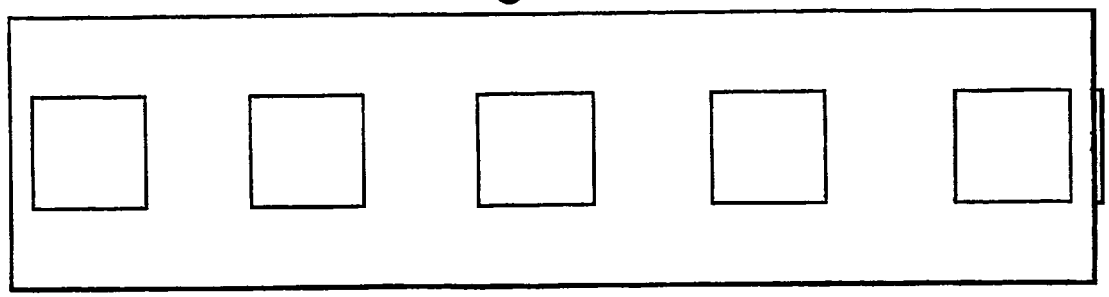
Modified H1 mask for 5-stage segmented movement

Fig. 19.
Visual showing parallax movement and image blur for five stage segmented movement
| Depth | Left 1 | Left 2 | Centre | Right 4 | Right 5 |
|---|---|---|---|---|---|
| 2mm | 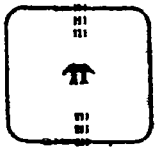 | 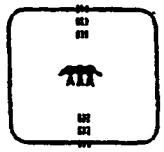 | 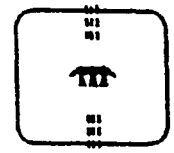 | 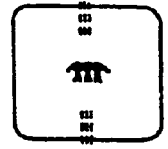 | 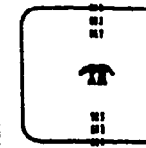 |
| 4mm | 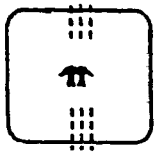 | 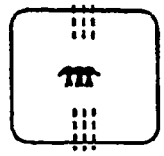 | 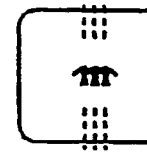 | 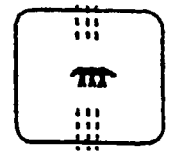 | 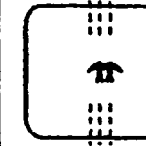 |
| 6mm | 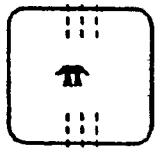 | 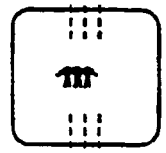 | 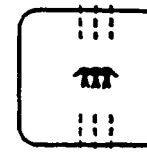 | 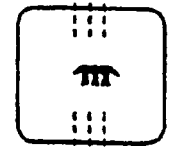 | 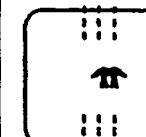 |
| 8mm | 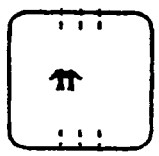 | 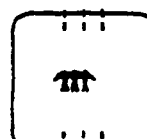 | 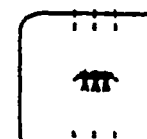 | 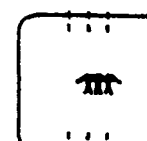 | 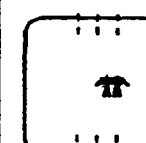 |

Axis of rotation

Modified H1 mask for modulating brightness of depth image as it progresses across total viewing angle Axis of rotation H1 modification for alternating colour change on progressing across viewing angle

SECURITY DEVICE USING PARALLAX MOVEMENT TO VIEW FRONT AND REAR LAYERS

The invention relates to a security device for use on articles of value such as banknotes and the like.

A well known group of security devices comprise surface relief microstructures which, in response to incident radiation, replay holograms, Kinegrams, Pixelgrams and other diffractive effects.

In order to keep one step ahead of the counterfeiter, more and more complex and intricate designs have been developed. These more complex designs increase the level of difficulty for the counterfeiter to produce a convincing counterfeit However, complex designs require more effort and closer inspection to verify and in general members of the public are not aware enough of the features to be able to make a judgement as to their authenticity. Where members of the public are expected to verify a device, it is important to keep the device as simple as possible and ideally to avoid the need to provide any form of training. The current invention seeks to provide a device that is both simple to authenticate and remains a significant challenge to counterfeiters.

In accordance with the present invention, a security device comprises a surface relief microstructure which, in response to incident radiation, replays a hologram viewable within a viewing zone, the hologram comprising at least a first, holographic image element in an image plane spaced from the surface of the microstructure, the device exhibiting at least one further image in a plane spaced from said image plane of the first holographic element, wherein the spacing between the first holographic element image plane and the plane of the further image is such that, on tilting the device, the first holographic image element exhibits apparent movement relative to the further image, the rate of movement being at least 6 mm per radian of tilt, and the product of the rate of movement and the included angle of the viewing zone defining a distance at least 20% of the dimension of the device in the direction of movement of the first holographic image element.

As we explain in more detail below, the inventors have undertaken a detailed study into the way in which holographic elements exhibit parallax when the device is tilted and the way in which this is interrelated with image blur. The particular combination of parameters defined above has been found to lead to a new security device which solves the problems mentioned above by utilizing movement and depth to allow the device to be easily verified but in such a way that the device is difficult to counterfeit.

In the past, the use of depth has not been exploited due to a number of limitations that are also a direct consequence of the origination process. The main limiting factor has been that the greater the depth of a feature, the less visually distinct it is under less than perfect viewing conditions. That is, under less than perfect lighting a feature present in a back or forward plane will be blurred. Previously, this has been viewed as unacceptable as the detail of the feature cannot be recognised. In the current approach, the absolute clarity of the feature in the forward or backward plane is not as important as the feature's presence and/or its interplay with other elements within the security device.

One example where the technique of classical holography leverages the parallax effect to create a novel form of optical variable effect security feature is described in U.S. Pat. No. 5,694,229, wherein a Moiré pattern is holographically recorded into a Benton rainbow hologram using the well-known two-step (H1-H2) transfer process. The Moiré pattern is recorded into the H1 hologram by creating an object image generated by the parallax interplay between two artwork components (e.g. transmission masks) located one behind the other and separated by a few millimeters. The artwork components illustrated within the inventive teaching being in each case a concentric periodic repeating pattern of circles and the resultant animated Moiré pattern being an alternating arrangement of light and dark fringes, whose spatial frequency at any point is determined by the effective "beat" frequency between the two periodic patterns. The artwork components are slightly displaced along the horizontal axis, but not in the vertical axis to ensure that the Moiré interference pattern is symmetrical along the horizontal axis, but not symmetrical about the vertical axis.

There are several important features of this art, which differentiate it from the current invention—firstly, and very importantly, it does not seek to convey a perception of depth per se, as is the intention of the present invention. Instead, the relative parallax movement of the two image components acts to convey the perception of dynamic animation when the observer moves his viewing position along the horizontal axis of parallax. It is the intention of the patent that the individual image/artwork components are not separately resolvable; only their mutual interference pattern; and therefore the observer will be unable to discern that one image component is located at a distance or depth behind the other.

Besides which, it is the preferred teaching of U.S. Pat. No. 5,694,229 that the two image components are described as having an inter-planar separation of just 2-4 mm in total, which falls below the minimum inter-planar separation of 6 mm that would be present between the holographic image components of the current invention.

Another example of a holographically recorded device which seeks to exploit the effect of parallax is described in US-A-2003/0151786A1; wherein the inventor describes how the conventional Benton H1/H2 recording and transfer technique can be modified using a concealed aperture or "parallax filter" to produce within the subsequent photo-resist (H2) master, a diffractive colour pattern, which appears to move in a continuous progressive manner along a line or path defined by the boundaries of a surface plane artwork element or graphic. This teaching seeks to describe methods by which classical holography techniques can be used to emulate in a more restricted way, the "kinetic" surface diffraction patterns described in U.S. Pat. No. 4,568,141 wherein the authenticity feature is a diffractive colour pattern moving at a constant velocity along a predetermined track when the document is rotated about its substrate normal, whilst eliminating the need for the labour-intensive and time-consuming holographic multiple exposure techniques described in the past by De Bitteto.

To illustrate how this technique works, consider FIG. 27 which shows how we would record a holographic image of a horizontal arrow using the conventional H1 recording process. Here we illuminate the arrow in transmission with the object light field generated by allowing laser light to pass through and be scattered by a diffusing screen. The resulting object light is then arranged to interfere with a second spatially reference beam of laser light (from same laser source) in the locality of the H1 recording to slit. Because of the scattering nature of the diffuser any point on the H1 slit "sees" the entire arrow illuminated. However, if we locate an aperture, as shown in FIG. 28, between the diffuser screen and the arrow artwork mask, then each point on the H1 slit only receives object light from a corresponding point on the arrow wherein the H1 slit position, the arrow location and the parallax aperture fall on the same line of sight. Hence we get a direct mapping between each point on the H1 slit and the a location of illumination on the arrow. When this H1 is subsequently transferred and the artwork image focal plane made coincident with the H2 plane, the resultant H2 hologram will provide an optically variable image, wherein on left-to-right tilting of the hologram the arrow will appear to have a band of light or colour which progresses continuously from left to right across the space defined by the boundaries of the arrow graphic. If this technique is applied correctly then the effect should be that of a surface colour movement pattern. The parallax aperture, because it is viewed through and limited by the arrow artwork mask, will not be discerned as a graphical entity in itself exhibiting a visual 3D depth sensation. If the arrow for security applications has horizontal dimensions typically of 10 mm or more, then to ensure the light movement band fully traverses the width of the arrow it is necessary to ensure that the parallax-selecting aperture is at least 6 mm behind the arrow mask. This distance scales proportionately with the dimensions of the movement required.

In some cases, the at least one further image is substantially spatially invariant relative to the device. This further image could be defined by the hologram or be non-holographic, for example being incorporated into the device as a printed image, partial demetallization or the like.

It is particularly advantageous if movement of the first holographic image element causes the first holographic image element to overlap the, or one of the, further images. This assists in verifying the device.

The optimum degree of movement is between 5-6 mm. This corresponds to a holographic depth of 8-10 mm and a viewing angle of approximately 40 degrees or 0.7 radians. This means within design template we can represent:
  the left view/switch by displacing symbol(s) 2.5-3 mm to the left
  the right view/switch by displacing symbol(s) 2.5-3 mm to the right In some cases, where the hologram defines first and second holographic image elements, these could both be formed in front of the plane of the surface relief structure, or both behind the plane of the surface relief structure. However, in the preferred embodiments, the elements are formed in planes respectively in front of and behind the plane of the surface relief microstructure.

A problem which can arise when viewing these security devices is that there can still be unacceptable blur as the device is tilted in the presence of certain light sources. In order to overcome this problem, the preferred device has a surface relief microstructure which replays the first and/or a second holographic element into a set of discrete, angularly spaced subsidiary viewing zones. The explanation as to why this has the effect that it does, is provided below.

In some cases, the or at least one of the holographic image elements will exhibit the same colour from all directions within the viewing angle (or zone). However, in other cases, the or each holographic image element may exhibit a colour variation as it moves.

The images can define a variety of shapes including alphanumeric indicia, graphical designs, symbols and the like. A shape may define a symbol by its nature or form (have a visual meaning, association or resonance with observer). Preferably, the symbolic form should be readily recognisable and may be directly (i.e. same as artwork on document) or indirectly (i.e. relevant to theme, region, value of document) linked or associated with a document (or article) on which the device is provided. Symbols typically have a minimum size or dimension of at least 2 mm. The symbol width and height should preferably be at least 3 mm but be less than 5 mm—i.e. the symbol should fall outside the boundaries of a 3×3 mm box but be enclosed by a 5×5 mm box. The extent to which the symbol may preferably exceed 3 mm is determined by its detailed form.

This sizing criteria firstly will ensure the symbol is large to be recognized by the unaided eye and secondly because the symbol's width exceeds the typical blur anticipated then its left edge and right edge outline will remain robust.

Examples of symbols are geometric shapes, trademarks, national emblems. Symbols should be contrasted with pixels of diffractive structures such as Kinegrams which are of a completely different order of magnitude. Such pixels in themselves cannot constitute symbols since they are not readily recognisable.

Generally the symbols should have simple discretely bounded shapes which fall into one of the following embodiments or categories:
  In one embodiment, the depth symbol should preferably consist of a single vertical structural element or segment combining with one or more horizontal sectors up to a maximum of 3:
    For example, a single horizontal element could give a T type structure
    whilst an example of a symbol with three horizontal segments would be the letter E
  In another embodiment, the symbol can comprise a diagonal structural element (at an angle above the horizontal of 45 degrees or more) combined with a horizontal segment.
  In another embodiment, the symbol can be two diagonal segments with one segment being at angle 45 degrees or more above horizontal and the other segment 45 degrees below the horizontal.

Devices according to the invention can be provided on or in articles such as articles of value including documents such as banknotes and the like. The article can provide a paper or plastics substrate. In addition, such devices can be provided in the form of transferable labels on a carrier in a conventional manner.

The hologram is viewable under white light illumination.

The surface relief microstructure is typically provided with a reflective backing such as a metallisation (continuous or ink demet pattern) or a high refractive index layer such as ZnS.

The microstructure can be formed by any conventional process such as hot embossing and casting. Hot embossing utilizes a metal shim that is impressed into a polymer carrier under heat and pressure, the carrier may optionally be coated with an embossed lacquer. Casting makes use of a radiation curing resin. The resin is cast onto a surface and is then embossed with the holographic relief during the embossing process or immediately afterwards the radiation curable resin is cured. This provides a more durable hologram.

A detailed explanation of the basis of the invention together with some examples will now be described with reference to the accompanying drawings, in which:

FIG. 1 illustrates the principle of parallax using two holographic image elements;

FIGS. 9 and 10 illustrate the appearance of four different devices in different tilt orientations under point source and extended light source illumination respectively;

FIGS. 11 and 12 are similar to FIGS. 9 and 10 but for a different set of devices;

FIG. 16 illustrates the replay characteristics of an example of a device according to the invention;

FIGS. 17 and 18 are plan and perspective views respectively of the replay characteristics of another device according to the invention;

FIG. 19 is a view similar to FIG. 9 but for devices similar to that shown in FIG. 18;

FIG. 20 illustrates a modified H1 mask for use in creating the device of FIG. 18;

Figure 2A:
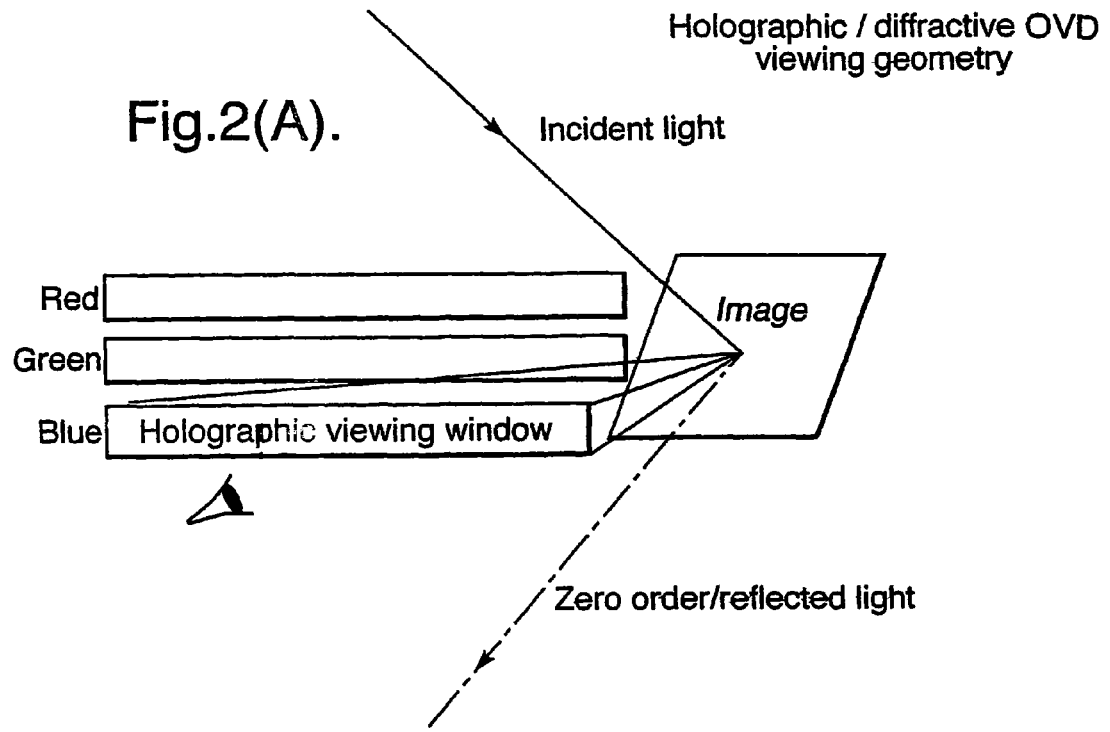
FIGS. 2A-2C show the replay characteristics of a rainbow hologram in perspective, plan and side view respectively.

In developing this invention, the inventors have investigated the phenomenon of parallax. Parallax is the apparent displacement of one object relative to another object (or objects), caused by a change in observational direction, which provides a new line of sight.

This effect can be readily observed as follows: consider holding two sticks directly in front of you, such that one stick is positioned behind the other and hidden from your line of sight (i.e. they are aligned along the direction of observation) and that the separation of the two sticks is significantly greater than their width. If you next move your head to the right or left so as to change your direction of observation (i.e. line of sight) then you see that the sticks appear to change their relative positions. This is made evident by the observation that the rear stick first moves out of alignment with the front stick, thereby becoming visible, and then appears to move away from the front stick (i.e. they mutually displace) with the mutual displacement being proportional to the angular change in viewing position.

It should be noted that the rate of mutual/relative displacement of the sticks with changing viewing position or angle is proportional to the separation between the sticks, i.e. the bigger the separation between the sticks the more rapidly they appear to "move apart" (or mutually displace) as viewing position moves away from the central "in-line" viewing position.

Also, the relative movement of the sticks is related to their relative distance from the observer. Specifically we observe that moving the viewing position to the right causes the rear stick to move or displace (in a relative sense) to the right and conversely causes the front stick to appear to move to the left. Clearly, movement of the viewing position to the left causes a reversal of the above.

Therefore, in summary, we see that these parallax related displacement effects allow an observer to judge both the relative distance between two objects from him and also which of the two objects is closer. If we further recognise that parallax information can equally well be used to make visual judgements about the relative distances of two points on a 3-dimensional object from the observer, we can readily appreciate the importance of parallax to the perception of depth, distance and 3-dimensionality in our everyday life—which is why the human brain has evolved to continuously and subconsciously evaluate parallax information (assisted by binocular vision providing simultaneous visual information from two "lines of sight").

Within the field of holography, parallax effects are central to the perception of depth provided by the holographic image. Specifically, it is the relative movement or displacement between elements of the holographic image, which generates the perception that a particular image element is some distance behind or in front of the surface of the device.

We next define certain terms:

1. When we use the term "hologram" we focus on the visual effect rather than the method used to originate the hologram. Therefore by "hologram" we mean any optically variable image, comprising a diffractive image generating surface relief microstructure and exhibiting parallax related movement/displacements effects between image elements on at least two planar layers, of which at least one image element is part of the hologram.

Such a device could be originated by current classical holography but could in future be generated by emergent direct write technologies.

2. The holographic image elements that can exhibit parallax related interplay are:

Holographic Image elements that appear to have their image plane located behind the surface plane of the surface relief microstructure or foil, i.e. they exhibit backward depth parallax.

Holographic Image elements that appear to have their image plane located in front of the surface plane of the surface relief microstructure or foil, i.e. they exhibit forward depth parallax.

Holographic Image elements which have their image plane coincident with the surface relief microstructure or foil surface and exhibit no parallax displacement (i.e. they are positionally or spatially invariant).

Non Holographic image defining elements:—these include Demetallised indicia, metallised boundaries of hologram and intaglio overprint or other non-diffractive features (again their positional invariance gives them a role as a "datum")

As will be clear, this invention relates to surface relief microstructures and should be contrasted with volume holograms.

Quantifying Parallax Motion in the Hologram:

Following on from this introduction to the concept of parallax using two aligned sticks, FIG. 1 shows two holographic image elements (shown as arrows) 1,2 located on front and rear layers or planes a distance LD apart. These are to be viewed through a rectangular viewing aperture 3 of length SL (akin to a Benton rainbow slit) a distance F away.

As discussed earlier as the observer moves away from a centre viewing position (CV) the sticks 1,2 misalign due to effect of parallax displacement. Now for simplicity we assume that the front layer is coincident with the surface layer of the microstructure generating the hologram and remains unchanged in position and we therefore obtain the three views represented below the viewing aperture in FIG. 1.

Now the total parallax displacement (PD) of the rear arrow 1 between the extreme right hand view (RV) and the extreme left hand (LV) is given by:

$$PD = XR + XL = 2*LD*\text{tangent (PhiMAX)}$$

where PhiMax=the uninterrupted viewing angle, either side of the surface normal
and with reference to FIG. 1 we see that $$\text{tangent (PhiMAX)} = SL/2(F+LD) \cong SL/2 F \text{ (since } F \text{ is typically} \gg LD)$$

Now although we have considered a very simplified geometry this result remains true for all cases. In particular we have made the convenient assumption that the front layer is coincident with the microstructure surface plane. However, the above result also quantifies the parallax displacement when the first arrow forms an image in front of the surface plane.

A comparison of the amount of parallax displacement recorded in to the rear plane of existing banknote holograms, with that present in a typical 2D/3D hologram used in cards, and with that present in devices according to the invention shows the following:

Existing banknote holograms provided in a few micron thick embossed film on flexible micro-rough banknote paper: depth/distance between layers 2 mm; viewing angle 22 degrees; Parallax displacement 0.8 mm (i.e. minimal).

Typical non banknote holograms i.e. Cards etc usually provided, either as a few micron(s) thick film, on smooth and rigid substrates (cards); or, as self supporting 25-50 micron film (i.e. label) on smooth or micro-rough surfaces (foil dimensions less than 30 mm×30 mm): depth/distance between layers 2-6 mm; viewing angle 22-40 degrees; Parallax displacement 0.8 mm to 4.5 mm.

Typical devices according to the invention: depth 6,8,10 mm; viewing angle for 6 mm sample @ 45 degrees giving parallax displacement of 5 mm; viewing angle for 8 & 10 mm samples @ 38-40 degrees giving parallax displacements of 5.8 & 7.2 mm respectively.

Rate of Parallax Displacement

One of the most noticeable differences between the depth samples recorded at 10 mm and 6 mm was not so much the total extent of parallax movement but rather the rate or speed of movement on twisting the substrate or changing angular viewing position along the axis of parallax.

If we define the rate of parallax displacement PV as PV=Total Parallax Displacement/(Total viewing angle) with the viewing angle expressed in radians. It then follows that $$PV = PD/(2 \times \text{PhiMAX}) = 2*LD*\text{tangent (PhiMAX)}/(2.\text{PhiMAX})$$

If we next recognise that as PhiMAX is expressed in radians and not degrees then we can make the approximation: tangent (PhiMAX)≅PhiMAX and consequently the rate of parallax displacement PV≅LD mm/radian.

Thus when expressed in radians the rate of parallax movement per radian equals the distance between the interacting planes or layers.

Depth-Related Image Blur

The biggest inherent drawback of surface relief, or embossed holography, as a visual medium, is the degree of chromatic aberration and blurring of the image that takes place under non-point source polychromatic (i.e. white light) illumination.

Figure 2B:
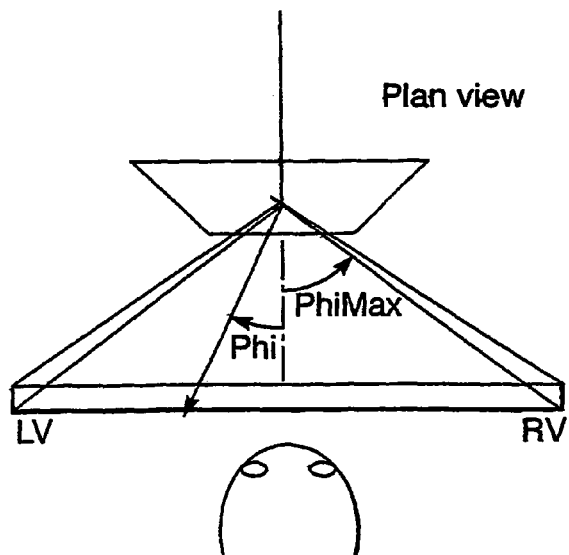
Figure 2C:
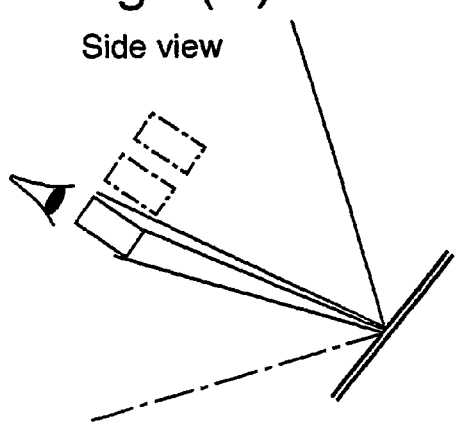

Image plane rainbow holography (invented by Benton) sought to limit chromatic aberration by sacrificing vertical parallax i.e. no vertical depth related vertical parallax effects are permitted—the benefit being a great reduction in chromatic aberration. This is illustrated in FIGS. 2A-2C, which show the replay characteristics of the rainbow hologram in perspective, plan and side view respectively.

In particular, we see that the light of a particular colour is replayed into a horizontal viewing zone or "slit" and should the observer alter his viewing position along the horizontal axis then he will see horizontal parallax and perspective effects. Conversely altering his viewing position in the vertical axis will cause him to see a rainbow progression of viewing slits—and therefore a particular image element, the same parallax effects in a progression of rainbow colours. However, there remains significant blurring of those image elements located more than a few millimeters from the surface plane. Now, to qualify the relationship between depth and blurring, the inventors recognised the need to recognise the optical consequences of the fact that all image elements are generated by the redirection or diffraction of light at the surface/foil plane.

Figure 3:
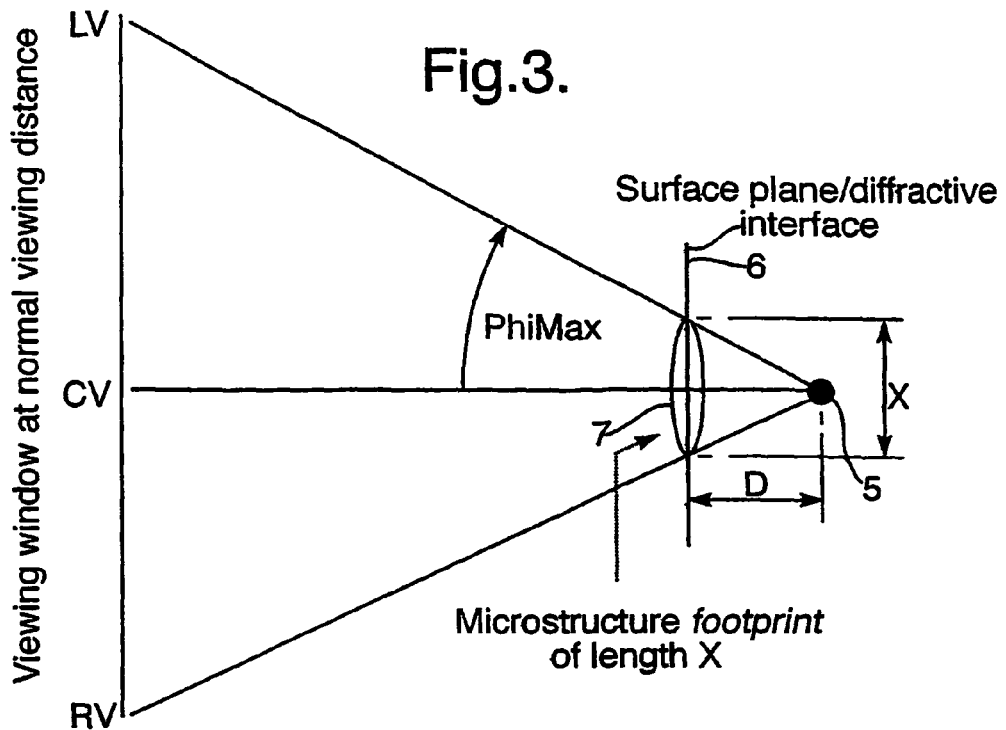
FIG. 3 is a plan view of a holographic/diffractive replay geometry for a holographic point image.

Consider FIG. 3, which shows a holographic point image 5 located a distance D behind the surface relief plane or diffractive interface 6 of the holographic device. Within this diagram, we are showing a plan view of the holographic/diffractive replay geometry such that all diffraction angles relate to the horizontal plane i.e. the plane containing the horizontal parallax movements/effects. The extreme left and right viewing positions are labelled LV and RV respectively and the centre view by CV.

Now suppose this holographic point image 5 is optically recorded so as to replay over a predetermined viewing angle equal to (2*PhiMAX) then it will necessarily generate a surface relief microstructure "foot print" 7 of length X at the diffractive interface, where $$X = 2*D*\text{tangent (PhiMAX)}$$

This microstructure footprint region in combination with the angular extent of the illuminating light source (along the axis of parallax) defines the dimensions of the image blur. To appreciate at least at a qualitative level, why this is so, consider FIG. 4, which shows the same microstructure point image viewed near the central zone CV but illuminated by light rays incident at a range of angles within the horizontal plane. Now, in practice within this geometry, the dimensions of the footprint 7 along the axis of parallax will be at most of the order of a few millimeters, whereas the dimensions of the viewing slit will be typically 150-300 mm (this is assuming the observer's eye is located between 200-300 mm from the plane of the device—a realistic viewing distance for any optical device)—hence within the plan view we may assume that all diffracted rays observed at the centre viewpoint are essentially parallel and have a negligible diffraction angle with respect to the normal to the surface plane.

Figure 4:
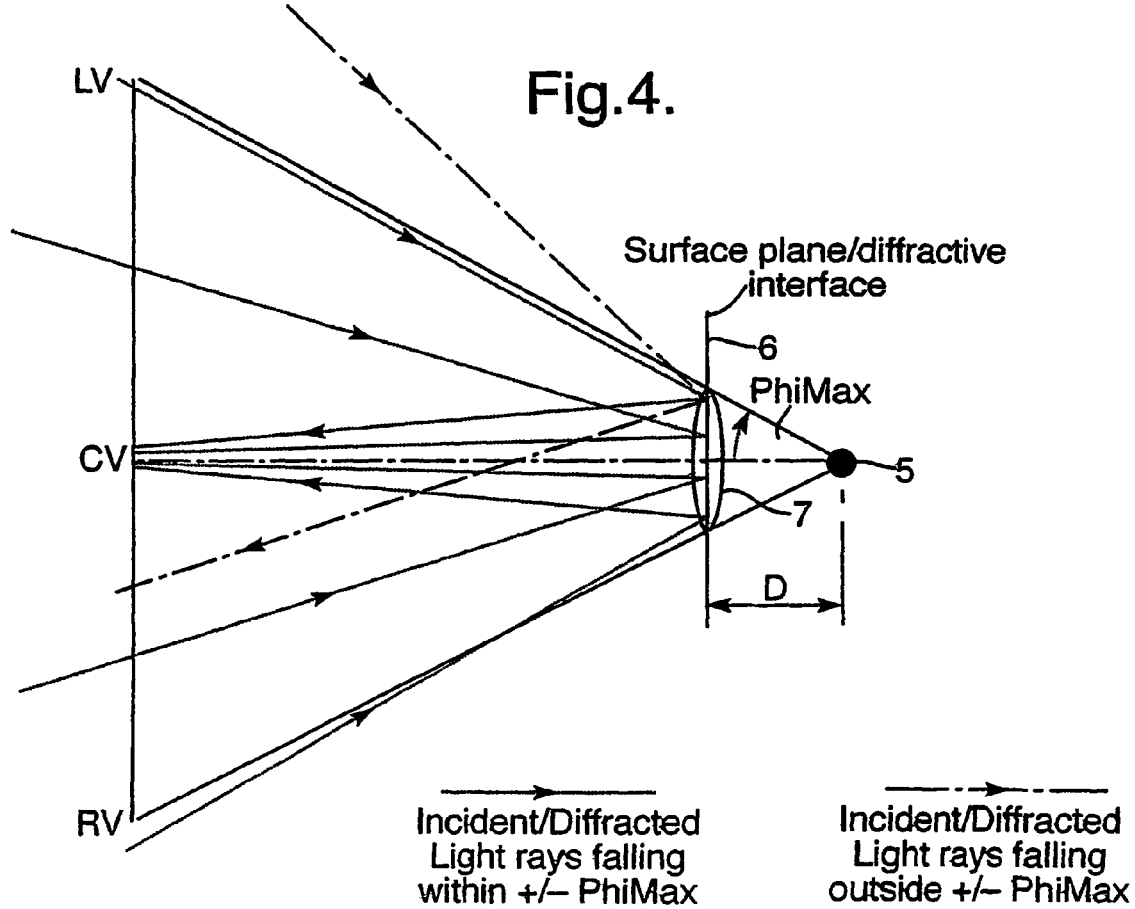
FIG. 4 is a view similar to FIG. 3 but showing the point image viewed near the central zone by light rays incident at a range of angles within the horizontal plane.
Figure 5:
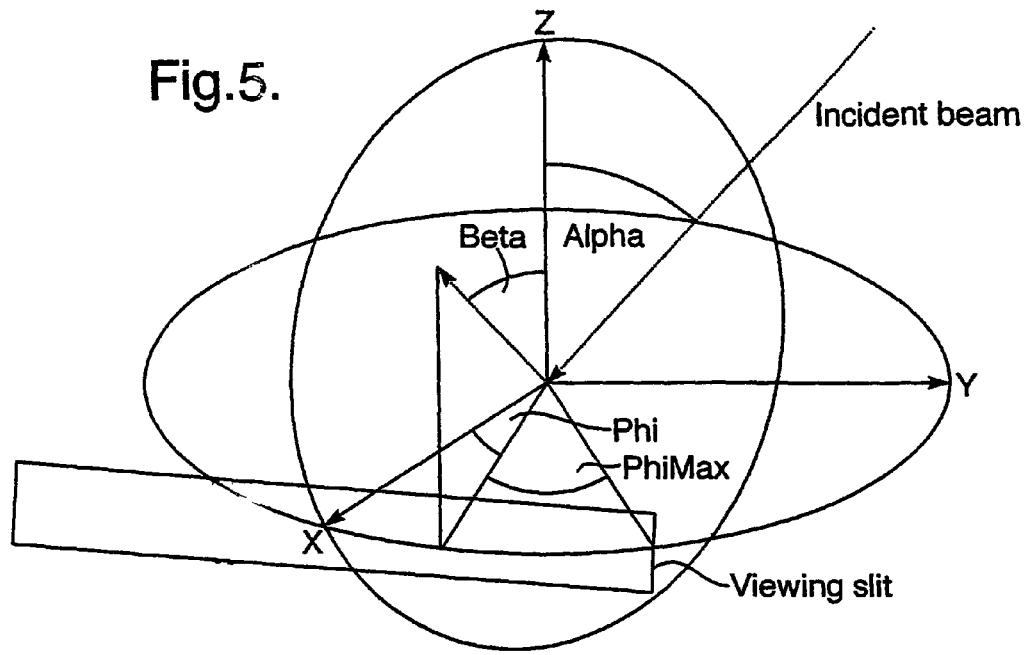
FIG. 5 illustrates a Cartesian coordinate system.

If we next reconcile our observation geometry as illustrated in FIGS. 2-4 with the Cartesian coordinate system of FIG. 5 wherein the standard diffraction angles Alpha and Beta are related through fundamental diffraction equation sin Beta−sin Alpha=mλ then it can be shown that all incident rays that fall outside the±PhiMAX acceptance angle with respect to the plan view device normal will not be relayed or diffracted into the observer's eye at the centre view point; one such ray (denoted by a heavy broken line) is shown in FIG. 4.

Figure 6:
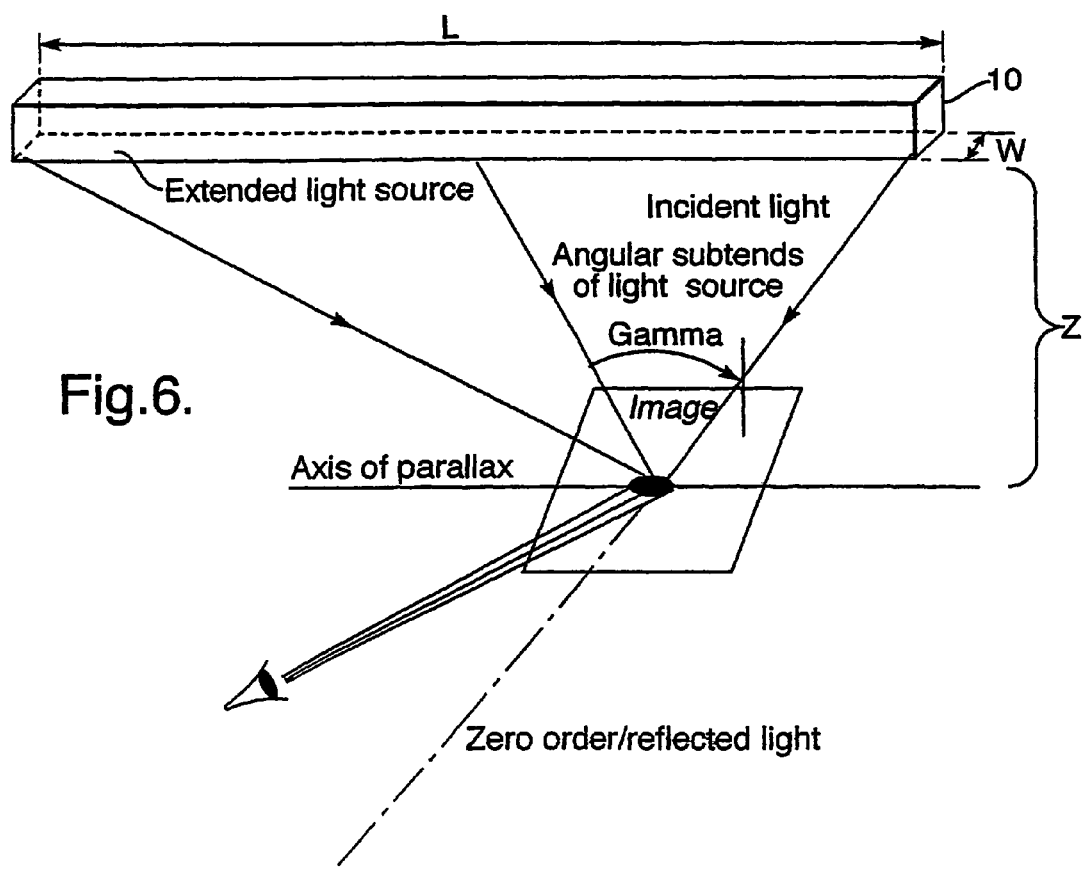
FIG. 6 illustrates the illumination of a device by an extended light source.

Let us now consider as shown in FIG. 6 an extended light source 10 located a distance Z from the point source image and with a dimension L along the axis of parallax. Defining the angular subtends Gamma of the linear light source as tangent (Gamma)=(L/2Z)

then should the angle Gamma equal or exceed the acceptance angle PhiMAX, the full width of the point image microstructure footprint will replay into the central viewing zone, smearing/blurring out the point source image to the width of the footprint X. If the subtended angle Gamma of the linear light source along the parallax axis is less than PhiMAX, then only a fraction of the microstructure footprint proportional to the ratio tangent (Gamma)/tangent (PhiMAX) will replay into the central viewing zone.

To express this more clearly let us consider a particular example, wherein suppose the hologram is recorded to have a total viewing angle of 45 degrees, hence PhiMAX equals 22.5 degrees (0.39 radians) and thus tangent (PhiMAX)=0.4.

Suppose this hologram is viewed under a linear light source whose longest dimension of 1 meter is initially, within our viewing geometry, aligned along the axis of parallax and located 1.5 meters from the device. Hence as defined tangent (Gamma)=L/2Z=0.333, thereby giving us a value for the ratio tangent (Gamma)/tangent (PhiMAX)= 0.333/0.4 of 0.8 X It therefore follows that the observed smear of the point source image will be 0.8 X.

Suppose we now change the viewing geometry such that the horizontal axis of parallax is aligned with the shorter dimension W of the lamp, which in this case we suppose to be 0.1 meters, giving a value for tangent (Gamma) of W/2L and therefore tangent (Gamma)/tangent (PhiMAX)=(0.03/0.4) 0.08 hence the observed point image smear ~0.08 X.

We therefore see that the same holographic image can, when viewed under a linear light source, have very different depth related image smear or blur, depending on whether its parallax axis is aligned along or transverse to the linear light source's long axis.

Now we have considered how the multiple incident light ray angles provided by a simple linear light source, increase the perceived depth related blur through the simple angular ratio (Gamma/PhiMAX). We find it convenient to introduce a light source/hologram illumination factor LF, which generally defines the effective angular subtends/input geometry of the light source arrangement. This value would for more complex arrangements represent a weighted average of each contributing light source; in terms of angular subtends, polar light intensity distribution, spatial coordinates etc. The value LF will have a value between greater than zero but less than or equal to 1, depending on its value in relation to the devices predetermined replay angle PhiMAX or more particularly tangent (PhiMAX).

We should also recognise that whilst when viewed along the centre of parallax the light incident either side of the normal up to incidence angles of +/− PhiMAX will contribute to the smearing or blur up to a maximum value of X, this will not be the case when the holographic point image is viewed at some angle Phi to the left or right of centre view line. Specifically if we view from the extreme right or left view, such that Phi=+/−PhiMAX, then only the relevant half of the microstructure footprint either side of centre can redirect incident light rays from a distributed source into the observers eye. Hence whilst the maximum point source image blur can have a value X when viewed at the parallax centre-point, this will reduce in value to X/2 at the extreme left and right hand view.

This variation of blur with viewing angle Phi can be summarised approximately by the expression $$VP(Phi) = 1/2\left(\frac{2\sin|PhiMax| - \sin|Phi|}{\sin|Phi|}\right)$$
$$= 1/2 \text{ for } |Phi|$$
$$= |PhiMax|$$
$$= 1 \text{ for } |Phi|$$
$$= 0$$

where we are taking the moduli or positive value of the above angles.

Finally bringing all of the above argument and conclusions together we obtain a generalised expression for the holographic point-image blur/smear S of:

S=LF(Gamma, PhiMAX)*VP(Phi)*2*D*tangent (PhiMAX)

Which for the simple case of the linear light source located directly above the viewer wherein LF=tangent (Gamma)/tangent (PhiMAX) for Gamma<Phi-MAX LF=1 for Gamma>PhiMAX further reduces to S=2*VP(Phi)*tangent(Gamma)*D for Gamma<PhiMAX S=2*VP(Phi)*tangent(PhiMAX)*D for Gamma>PhiMAX From this result the inventor observed the following:

Case I: Where the linear light/distributed light sources angle of subtends along the axis of parallax exceeds the predetermined holographic viewing/replay angle, the depth related blur is determined by the product of the viewing (half) angle and the depth.

Case II: Where the linear light/distributed light sources whose angle of subtends along the axis of parallax is less than the predetermined holographic viewing/replay angle, the depth related blur is determined by the product of the angular subtends (half-angle) of the light source along axis of parallax and the depth.

Consideration of the expressions derived for blur/smear S and parallax displacement PD shows them to be closely related phenomena in that they are both the product of an angle term and a depth/distance term.

As regards the angle term this will only be the same (i.e. tan (PhiMAX)) under the lighting configuration Gamma>PhiMax. Whereas more typically the blur will conditioned by the lighting subtends angle Gamma, i.e. the is more the light source departs from the ideal of a point source, the blur is apparent for a given depth. As regards the depth/distance term, blur will be conditioned by the distance of a particular layer from the diffractive interface (sometimes known as the image plane) i.e. forward or backward depth in its simplest terms; whereas parallax displacement or movement will be specifically conditioned by the inter-planar separation or distance between the two interacting images. Consequently if the parallax displacement required within the hologram design demands a layer separation D then if we chose to locate our image planes symmetrically in front and behind the surface or microstructure plane then we halve our image blur compared to the scenario where we have one element on the surface layer and the other element either D mm behind or in front.

In short, in order to minimise image blur in relation to parallax movement it is advantageous to design parallax effects based on the interplay between elements having forward and rear plane depth.

To get some typical values for blur consider an image point located either 2 mm or 6 mm behind the surface plane, we shall assume the holographic image has been recorded with a viewing angle of approximately 40 degrees and is illuminated with a fairly typical extended or linear light source of length L=0.75 meters and width W=0.1 meters, 1.5 meters above the plane of the image. This gives values for Gamma with the parallax axis parallel/aligned with and transverse to the length of the linear source of 0.25 and 0.03 respectively.

We shall also assume for simplicity an average value for the viewing position factor VP (Phi) of 0.75.

Then for transverse observation (tangent (Gamma) =0.03, hence S=0.05*D).

Blur S @ 2 mm≈0.1 mm; S @ 6 mm≈0.3 mm i.e. depth related blurring is minimal and the image elements with dimensions of a few millimeters are visualised with a sharpness approaching point source illumination.

Whilst for observation with parallax axis aligned to length of light source (tangent Gamma=0.25, hence S=0.375*D)

Blur S @ 2 mm≈0.75 mm; S @ 6 mm≈2.25 mm i.e. image elements with dimensions approaching a few millimeters, will appear slightly blurred/fuzzy but delineated and recognisable @ 2 mm depth but will appear significantly blurred and intricate graphical detail indiscernible @6 mm depth.

In summary, an important part of the design process is the ability to pre-visual the effect of strip light blur.

This can be achieved as follows:

Given a depth movement of 5-6 mm, we can calculate a typical strip light blur between 2-3 mm. This assumes a typical length for a strip light of 0.75 m.

Given this blur value we start by taking a copy of the symbol and superposing it on the original symbol with a displacement of 1.5 mm to the right. We then repeat this process but this time displace to the left.

We then take further copies and superpose them again left and right of centre image, but this time 0.5 mm and 1.0 mm.

This process should be repeated again taking copies and superposing left and right of centre image by 0.25 mm, 0.75 mm and 1.25 mm.

By this stage, we have a reasonably continuous superposition of movements—the overall resultant shape gives an accurate impression of the symbol under diffuse light.

Smear or Blur of Hot-Stamped Image Due to Substrate Roughness

Figure 7:
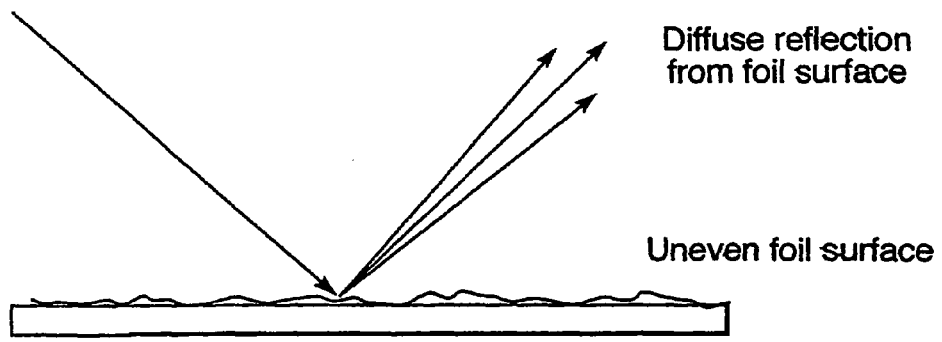
FIGS. 7 and 8 illustrate the effect of angular diffusion from uneven and smooth foil surfaces respectively.
Figure 8:
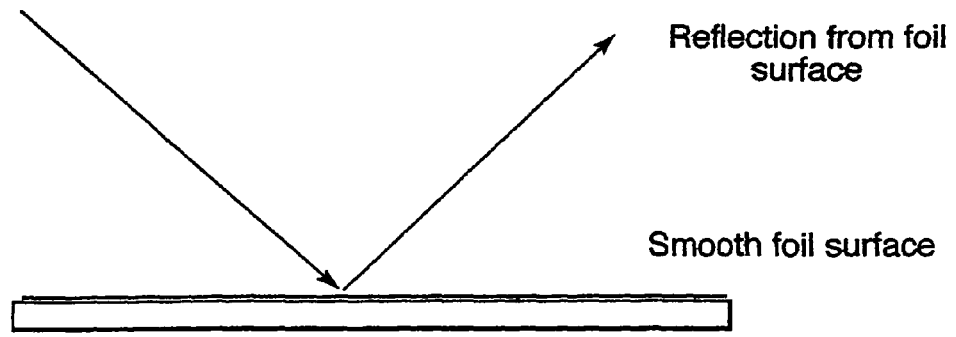

The design of a banknote hologram has to take into account not only the effects of extended light sources but also the angular diffusion (loss of specular gloss—see FIGS. 7 and 8) of its replay characteristics due to the tendency of the microscopically thin hot-foil lacquer to "take up" the undulations of the underlying banknote paper when applied under heat and pressure. For example, typical diffusion angles range from 6 to 12 degrees. The Holographic image reconstructed from a microstructure within such an uneven surface will be diffused similarly, with the result that blurring of the image and colour smearing will occur. It is not so much the amplitude of the surface variations in the paper substrate but rather the variations in slope angle about the horizontal that critically determine the diffusion angle. The degrees to which these variations in slope angle are taken up by the foil are dependent on factors such as adhesive type, weight, application temperature (relative to embossing lacquer critical softening temperature) etc.

Now it can be readily shown that the image blur due to diffusion angle is approximately defined by the product of the depth D times the tangent of the diffusion angle. Assuming a working diffusion angle of 8 degrees we get values of substrate blur for 2 mm, 4 mm & 8 mm of depth as approximately 0.3 mm, 0.6 and 1.2 mm respectively. We therefore see from these results that image blur due to surface roughness is comparable to lower end of blur or smear due to typical extended light sources and therefore almost doubles the "worst case" blur/smear for any image element located in front of or behind the plane of the device.

Utilizing Parallax and Blur Analysis to Optimise Provision of "Depth"

The following section seeks to address the following issues:

Firstly what is the minimum level and rate of parallax motion or displacement that can be clearly discerned by an individual with little or no experience in looking at holograms?

Secondly given the attendant effects of depth blur, what are the artwork criteria in terms of size and graphical form which ensure, for the desired level depth or parallax displacement, discernment of basic symbolic form under all reasonable lighting conditions?

The first point that should be made is the phenomenon of parallax is a relative concept in that the perceived level of apparent displacement is, at a psychological level, scaled in relation to the dimensions of the interacting elements: which in the context of a security hologram or diffractive OVD will be the effective dimension of the visible image area (the dimensions of the OVD in the majority of cases) along the axis of parallax or put more simply, the "moving direction"

and/or the dimensions of the holographic image elements particularly in the moving direction and/or the dimensions along the moving direction of any optically invariable features such as print, de-metallisation patterns—the latter also commonly defining the dimensions of the visible image.

To develop this aspect further consider the most elementary OVD design scenario composed of a single holographic image element located in the centre of a "patch" type image/device. We assume the dimensions of the patch are 22 mm×22 mm which is a typical hologram/OVD size for banknote application. The dimensions of the image or symbol are around 3 mm in the moving direction (east-west).

If we next assume this hologram has a viewing angle 2*PhiMAX of 40 degrees—which is very typical of a Benton Rainbow Hologram, then applying the formulae derived for parallax displacement and blur to a range of depths D=LD=2, 4, 6, 8 mm we arrive at the results which are summarised in FIGS. 9 and 10 showing appearances at actual size.

Referring first to FIG. 9, this shows the apparent location of the depth image in the three pertinent views left, centre and right, whilst viewed under point source lighting at the range of depths described above. The key point to note is that for the typical holographic replay angle used in this simulation, clear and recognisable parallax or depth movement only occurs at depths of 6 mm and above in the sense that:

within each of the three views the centre of gravity of the image has clearly shifted with respect to the left and right hand boundaries of the device—which function as positional datums.

We also note that the parallax displacement PD in the 6 mm case equals 4.4 mm which as a fraction of the image width is 20% (26% for 8 mm deep image).

Finally we note that the parallax movement in the 6 mm deep image is some 150% of the chosen symbol/image width of 3 mm. We shall comment on the significance of the symbol width and type next.

Consider next FIG. 10 which shows the same image arrangement and matrix of depths, this time illuminated by a 0.75 m linear light source. We have endeavoured to simulate the smear effect by displacing and overlaying a copy of the central image by +/− 0.5 S. As expected the smear or blur becomes visually significant at 4 mm and above, however because of the shape and graphical form of the image its essence is still recognisable at the desired minimum depth of 6 mm. Specifically the average smear S across the viewing zone at this depth as we calculated before equals 2.25 mm. We recognise that this is due in part to S being less than the Symbols width/maximum dimension of 3 mm along the moving axis.

Additionally and more subtly we recognise that this shape is "depth tolerant to 6 mm" because the difference between that particular symbol's maximum dimension and minimum dimension along the direction of movement, namely 2 mm, is comparable to the average blur S.

In summary therefore the visual expression of our analysis and results in FIGS. 9 and 10 shows us that for a typically sized high security hologram or OVD; 6 mm of inter-planar separation or depth provides (for typical parallax view angles) a critical threshold of parallax displacement that can be clearly discerned within the context of the most simple image design, being as it is at least 20% of the width or dimensions of the image along the movement/parallax axis. It is pertinent to note that testing or verifying that a hologram contains an inter-planar separation (LD) of 6 mm is extremely difficult, a more useful measurable would be to recall that LD is numerically equal to the rate of movement per radian PV. We may therefore re-express the above by saying that we require as the first condition the depth image to exhibit a minimum of 6 mm of movement per radian.

Note if we consider a practical maximum for the viewing angle along the parallax axis to be one radian, then we are requiring that the width of the device along the moving direction be less than 5 times the inter-planar separation or depth. For the case where LD equals the minimum of six millimeters then the hologram width or dimension along the moving direction must be less than 30 mm. For the case where LD equals 8 mm then the hologram width or dimension along the moving direction must be less than 40 mm.

We further recognise that in preferred examples where the image/symbol dimension is at least 3 mm along the axis of parallax/movement we ensure that it exceeds the blur typically manifested at such depths and therefore its form remains recognisable under most lighting conditions.

Finally we further recognise that the depth movement will be more clearly discerned if the symbol moves by at least its own width or maximum dimension due in essence to the fact that there will be little or no overlap between the centre of gravities of the images of the symbol corresponding to the extreme left and right hand view.

Having specified at a primitive level the preferred criteria for rate of movement, the scale of movement as a percentage of the device dimension along the parallax axis, the scale of movement in relation to the dimensions of the parallax exhibiting symbols and finally appropriate dimensions and form for the symbols themselves, we next consider how we may alter the composition or design of the hologram or OVD to further emphasise parallax or depth effects. This is best achieved with reference to FIGS. 11 and 12 which show the same image matrix as before, under point and extended illumination. However this time the depth images or symbols 50, 52 are disposed east-west about a central image 54 and north-south between a repeated arrangement of satellite images, with central image and satellite images located on the surface plane or diffractive interface and thus positionally invariant. The invariant images may be formed by the hologram or alternatively be non-holographic.

The first thing we notice is that because the depth elements are now located much closer to positional datum's on either side then even though the absolute movements are as before the perception of movement is much stronger. This is further enhanced when an overlap event occurs, when part or all of the depth images pass behind or in front of the central shield or image edges.

Figure 25:
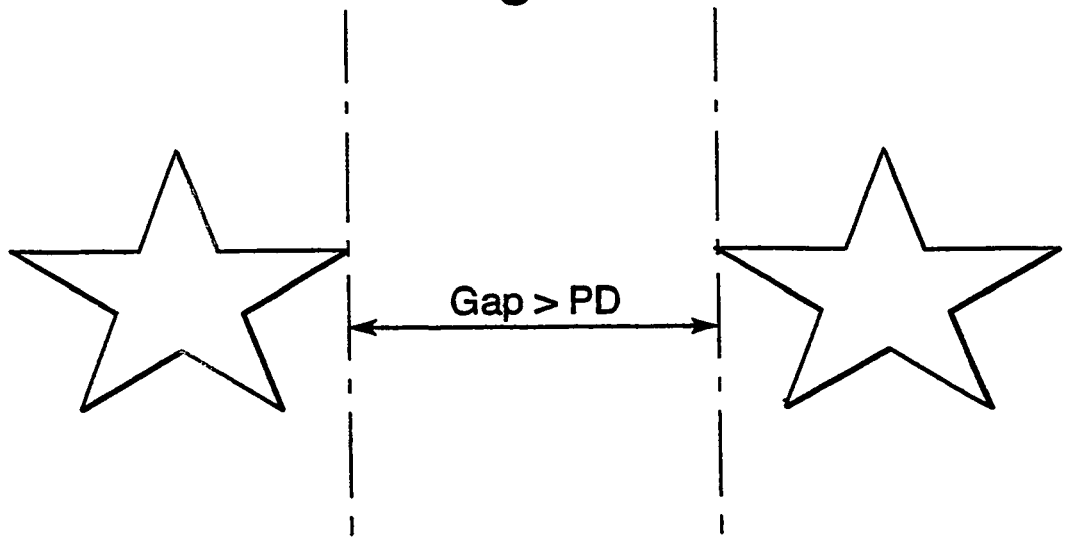
FIG. 25 illustrates two symbols and the gap between them.

It should be appreciated that if we have two or more symbols on the same holographic depth plane (forward of or behind surface plane) then it is necessary to ensure that in the worst case of light source blur there is no visual overlap of the two adjacent depth symbols. We can ensure this by requiring the gap between the two symbols to exceed the level of parallax motion PD, set at the design stage. We define the meaning of the term "gap" more precisely by considering two design artwork symbols displaced along the horizontal axis of parallax. If we construct two vertical lines, one just touching the right-hand edge of the left symbol and one just touching the left-hand edge of the right hand symbol (see FIG. 25), then the "gap" is the separation of these two lines along the moving direction. For illustrative purposes we have considered the moving direction to be the horizontal axis of parallax, however it is conceivable that the moving direction could be along the vertical axis or some axis of inclination in between.

For further simplicity at the design stage we may advantageously further strengthen this constraint by requiring the lateral distance between the two symbols to be numerically equal to the inter planar distance (depth) where the maximum viewing angle is unlikely to exceed 1 radian.

Methods of Manufacture

There are currently within the optical security industry a number of individual techniques, methods or recording systems used to produce diffractive OVD's (Optical Variable Devices) and many of the design rules in this paper will apply to techniques other than the H1/H2 classical "Benton Rainbow" Holography method, which hitherto has been the preferred method of the Inventors. We use classical holography examples to illustrate the practical utilisation of the present invention for that reason only, and we consider that many of the principles apply to all of the techniques and in some cases, for example where vertical parallax is required, we believe that the direct write technologies may offer advantages over classical holography. It is the visual optical variation presented to someone unskilled in the art for the purposes of public recognition and verification under a range of illumination conditions, which is the primary focus of the invention.

This optical variability, being manifested through predetermined levels, rates and types of parallax displacement, we can envisage being provided in either the horizontal axis, the vertical axis, or at some angle to either axis. Classical holography has the property that it effectively reconstructs the original image wavefront recorded from the illumination of an object in laser light on the optical table.

For more detailed description of the concepts that underpin holography and in particular classical "Benton Rainbow" holography reference should be made to "Practical Holography" by G. Saxby.

Figure 13:
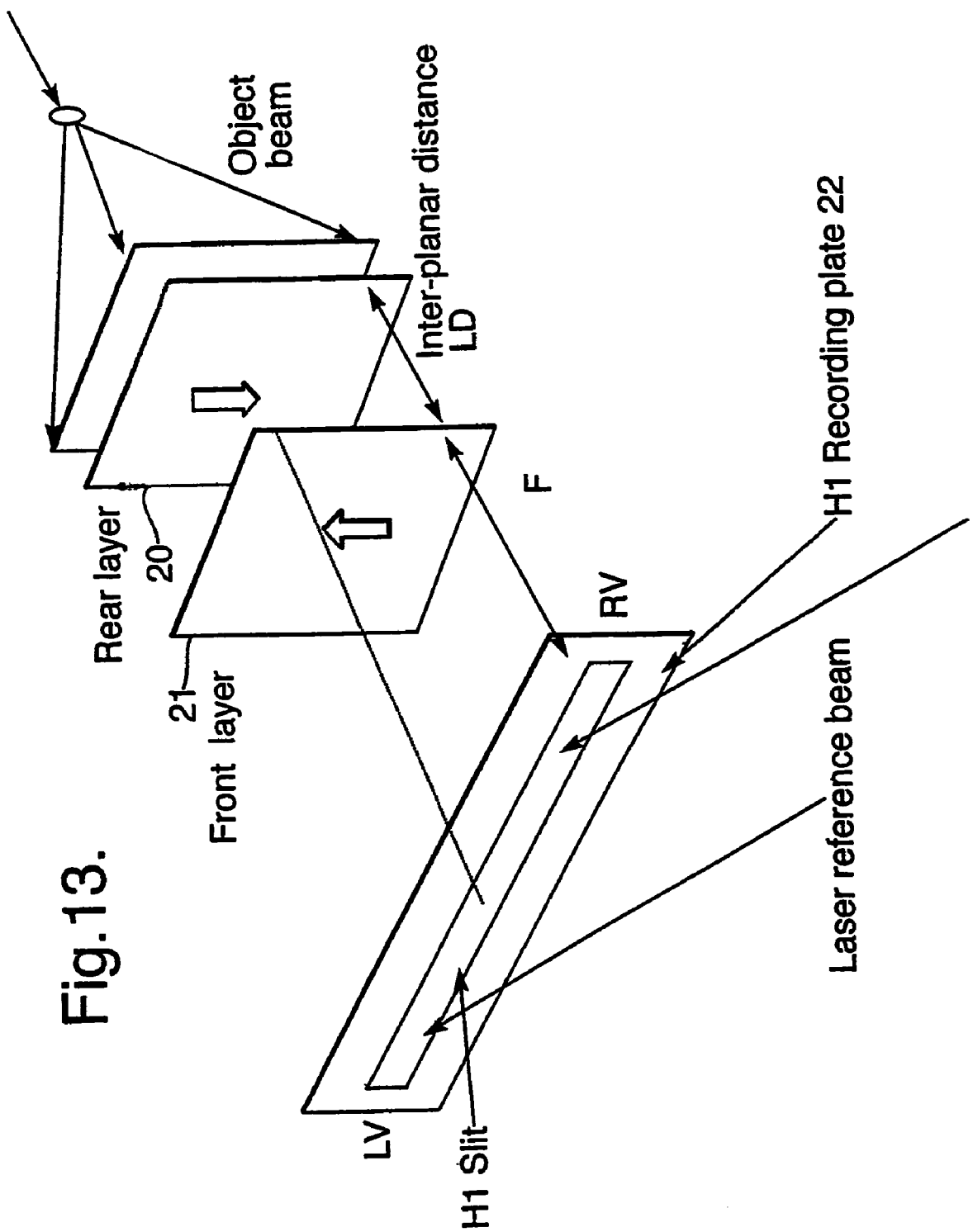
FIGS. 13 and 14 are isometric and plan views respectively of an optical arrangement for creating a H1 recording plate.
Figure 14:
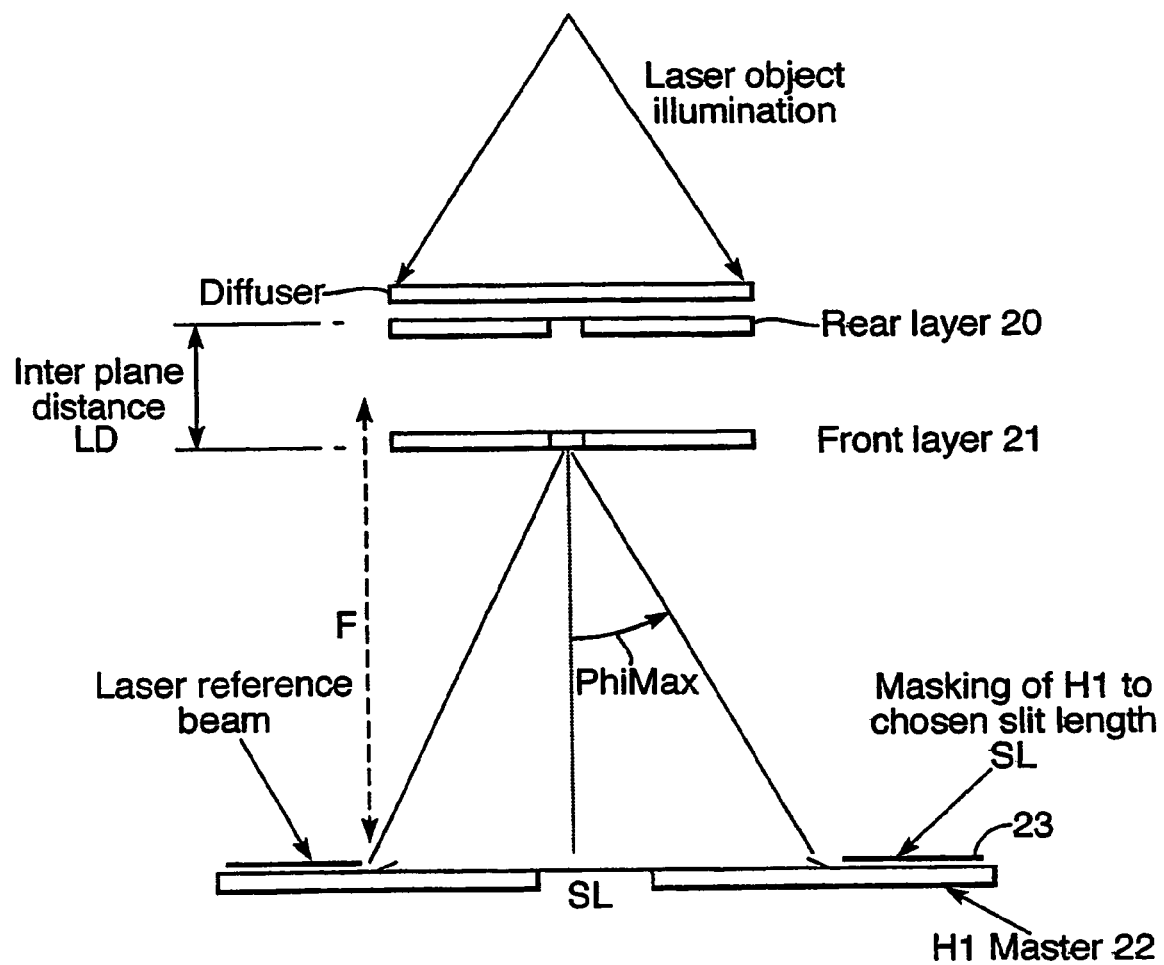

For the purposes of constructing devices according to the invention, the first stages of the recording process are represented in FIGS. 13 and 14 which show the H1 recording geometry in isometric and plan view respectively. The image-providing object as is represented in the diagram is typically a stack of glass photographic or orthographic plates (transmission masks) 20,21 comprising a number of layers of planar artwork (generally 1-3, rarely more). The object wavefront transmitted by the artwork transmission mask assembly or stack 20,21 is allowed to overlap with a second beam of light known as the reference beam. The latter's wavefront being typically simple collimated or spherical in nature. The resultant interference pattern between object and reference beam (which in essence defines the holographic process) is allowed to expose regions of a recording plate 22 known in the art as the H1 master through a mask 23. The H1 master 22 is typically an optically flat and homogeneous glass plate coated with high resolution Silver-Halide emulsion.

The exposed regions of the H1 recording plate 22, are generally elongated and rectangular in nature and are hence commonly referred to as "slits". The various slits within the H1, each individually corresponding to colour/animation component or depth components (i.e. layers) of the final image, are exposed sequentially such that a phase recording of each individual artwork component is recorded in the plate. The surface of the fully exposed H1 recording plate comprises zones of recorded image information. A simple multicolour rainbow hologram would typically comprise a number of slit shaped apertures in its mask, which correspond to individual colour components including foreground and rear-plane features.

Subsequent illumination of the H1 with a conjugate laser reference beam results in the reconstruction of a real image comprising all of its components at a position spaced approximately 200-300 mm from the H1 plate.

This reconstructed, projected image is carefully focussed by proprietary means, and is then used to form the subject matter of a second (H2) Hologram generally recorded in a photo-resist material 24 (FIG. 15) capable of hosting a surface relief hologram microstructure suitable for metallisation and production embossing.

The hologram is typically embossed into a lacquer on a carrier, metallized and then transferred on to a substrate. This may be a document or other article of value, particularly a paper based substrate for a banknote or the like since the inventive structures replay well even when supported on rough paper.

Figure 15:
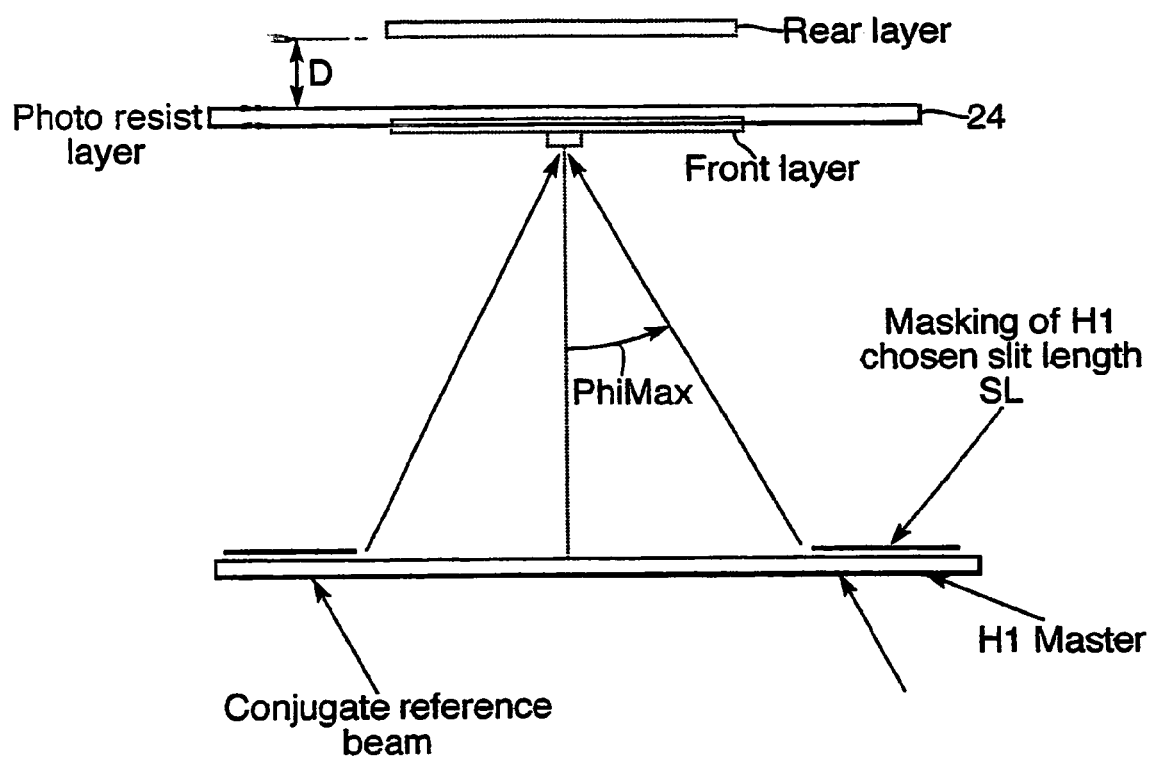
FIG. 15 is a plan view of an optical arrangement for creating a H2 plate.

The transfer of the holographic image from essentially a volume recording within Silver Halide to a surface relief recording in photo-resist is known in the art as the H1>H2 transfer process. It is important to realise that it is the location of the photo resist surface (which forms the diffractive interface) relative to the front and rear layers which determines the respective depths of these layers. As shown in FIG. 15, the front layer is essentially coplanar with the resist surface and therefore its depth D is essentially zero, whereas the rear layer forms a virtual image depth D=LD behind the resist surface. Thus in the focal configuration shown, the front layer will be positionally invariant whereas the rear layer will through its apparent displacement relative to the surface plane features provide the psycho-optical perception of depth.

The first parallax parameter we wish to encode into the holographic OVD, is the rate of parallax movement per radian PV. If the two image elements which are providing the relative parallax effect or displacement are the two artwork transmission masks 20,21 shown in FIGS. 13, 14, then we know from earlier theory that the inter-planar separation between masks LD should be made numerically equal to the required displacement rate PV.

For example should the required rate of motion be 6 mm per radian then the spacing LD between transmission masks should be set at 6 mm.

Having configured the Holographic set-up to have the required inter-planar separation LD we next need to adjust the recording geometry to set PhiMax at an appropriate value in accordance with the additional preferred design rules. Namely that:

the parallax displacement PD should be not less than 20% of the effective width of the OVD in the "moving" direction the parallax displacement PD should be greater or equal to the width of at least one of the moving symbols (preferably the width of the symbol with the smaller dimension)

the illumination averaged blur or smear S should not exceed the width of the moving symbol.

Now having experimentally set the rate of movement PV, we find it convenient to recall that:

$$PD/LD=PD/PV=2*\text{tangent (PhiMax)}$$

And similarly that $$S/PD=<LF>*VP(\text{Phi}=0)*D/LD$$

Where the "vee" brackets around LF indicates that we take its value averaged over the spectrum of illumination conditions.

Assume an average value LF as the arithmetic mean of the practical point source LF (=0.1) and the worst case extended linear source LF (=1), which =0.55.

Therefore since the value of VP at (Phi=0) is 1.0, the above simplifies to $$S/PD=0.55*D/LD$$

Suppose, in scenario A, we select as our design choice a symbol of 3 mm dimension which we further choose to be located at 6 mm behind the surface plane; the other elements which it interacts with being located on the surface plane. Hence D=LD=6 mm. Now as we require S to be less than 3 mm it therefore follows in scenario A that the parallax displacement must be less than 3/0.55 or 5.45 mm.

To more precisely specify the required level of movement PD we next invoke the second requirement, namely that PD must not be less than 20% of the effective width of the device which as part of scenario A we suppose to be 22 mm. This then requires the parallax motion PD to lie within 5.45 mm and 4.4 mm. What value within this band was chosen for PD would depend on whether movement or "symbol delineation" under linear light sources was of greater importance to the holographic or OVD designer.

Suppose it was the latter and we chose PD to have a value of 4.4 mm, then it follows that tangent(PhiMax)=4.4/(2*6)= 0.366. Therefore to provide the desired viewing (half) angle PhiMax within the recording geometry of FIG. 13, we locate masks at either end of the H1 recording slit such that its length $$SL \approx \text{tangent(PhiMax)}*2*F$$

Supposing F to be 250 mm then this sets a value for SL of 183 mm.

However, for a scenario B, suppose the effective width of the OVD is defined to be 35 mm, thereby giving a minimum level of movement PD of 7 mm. Now we know from above, if only one of the interacting elements or symbols has been imaged behind or in front of the diffractive or surface plane so that D=LD, then the associated light-source average image blur will have a value of 0.55*7 mm which is nearly 4 mm. Consequently to remain within one of the preferred embodiments of the inventive teaching, namely symbol size along the movement axis should be greater than typical blur we must increase symbol size to at least 4 mm.

Alternatively should the design require the symbol size to be less than 4 mm then we can alter the recording arrangement such that the "rear" symbol or image element (exhibiting backward depth) doesn't primarily interact with positionally invariant elements on the surface plane but instead with one or more other symbols or image elements, which are located in front of the surface plane thus exhibiting "forward depth".

Specifically, during the H1 recording as illustrated in FIGS. 13,14, we still require the planar distance LD between the two artwork planes defining "rear" and "forward" symbol or image planes to be 6 mm. However this time during the transfer stage we locate the surface of photo-resist layer within the projected image volume such that the forward depth layer or plane comes to focus 2 mm in front of surface plane and the rear layer comes to a virtual focus 4 mm behind image plane. By doing so we ensure that rate of relative parallax motion between the interacting elements remains at 6 mm.

Now the average blur or smear exhibited by the "rear" symbol will be given by 0.55*4/6*PD which equals 2.6 mm, whilst the "forward" depth element will exhibit an average blur of 0.55*2/6*PD which equals 1.3 mm. Hence by sharing the blur or smear associated with the increased level of parallax displacement we return to the preferred scenario wherein the average blur or-smear is less than the symbol size along the direction of parallax displacement, which in this particular example is 3 mm.

Finally in accordance with previous teaching, the new viewing or parallax half angle PhiMax required to provide 7 mm of movement is given by tangent (PhiMax) now equals 7/(2*6) or 0.58—hence the slit length SL which is the result of the calculation 250*2*tangent(PhiMax)=290 mm.

Reducing Death Blur Through Interrupted or Modulated Parallax Motion

We have seen in FIGS. 3 and 4, how the blur in an embossed hologram or OVD is determined by the effective microstructure "footprint" generated at the diffractive interface (i.e. the photo-resist surface during the H2 recording process and the embossed lacquer/reflective coating interface in the final foil device).

Specifically the "footprint" generated by any point on the holographic image is proportional to the product of the uninterrupted total viewing angle and distance of the holographic image behind or in front of the surface plane. The replay characteristics of such an OVD providing uninterrupted or unmodified parallax motion in the horizontal axis is shown in FIG. 16. In this context we mean parallax motion in which the "moving image(s)", when they are not passing behind or being eclipsed by other image elements appear with essentially unmodified brightness or colour over their entire parallax viewing zone and also move with a constant rate PV (expressed here in mm per radian).

However the inventors recognised that if the total angular viewing zone is segmented by recording or creating a surface relief structure which significantly modifies or modulates the visible brightness or colour of the moving image(s) as it is observed across its parallax movement then it is possible to radically alter the relationship between holographic image depth and the attendant blur or smear due to non point source lighting.

Consider FIGS. 17 and 18 which show plan and perspective views of a first embodiment of this concept of interrupted or modified parallax motion, wherein a holographic "depth" image is shown replaying into N (=5) discrete angular zones in the horizontal axis—i.e. the image is viewable in each of these zones but is not visible in the angular voids in between.

If we assume for simplicity that the viewing zones and intervening void zones are equal in angular extent then the angular width of each viewing zone =(Viewing angle)/(2$N$−1)

Suppose total viewing angle was 40 degrees (0.7 radians) then if there are 5 segmented viewing zones then each such viewing zone will cover 4.5 degrees (0.08 radians).

Now the microstructure foot print left by each viewing zone at the diffractive interface we see with reference to FIG. 17 will also scale down by the factor (2$N$−1). It therefore follows from basic geometry that the depth related blur or smear $S_n$ will de defined by $S_n$=2*$LF$*$D$*tangent (PhiMAX)/(2$N$−1)

Suppose the depth is 8 mm, and we chose through either our H1 recording or H2 transfer process to limit PhiMAX to 20 degrees or 0.35 radians, then also substituting N=5 and LF=0.55, we get a value for the depth related smear/blur S of 0.35 mm for the image when viewed in each of the viewing zones under fairly extended strip lights. This should be compared to the smear value $S_n$ of 3.2 mm when the surface microstructure needs to generate an image that is continuously viewable across the full viewing angle.

Therefore we have a method for providing a holographic image a significant distance behind the surface plane and yet which remains reasonably resolved under strip light illumination.

However, again careful thought needs to be exercised when applying this method. For example, the angular subtends of the strip or linear lighting assembly (i.e. 20 degrees) allows images from neighbouring viewing zones and their associated microstructure portions. In short at any particular viewing zone we shall see (for the case of 5 degree viewing zones) 2-3 split images; composed of the central image for that viewing zone and adjoining alias images.

A full visual representation of the motion, blur and image content for each of the five channels is shown in FIG. 19.

Now on initial consideration it seems that if we focus on reducing blur and multiple imagery then we should make our angular viewing zones as narrow as possible and increase the angular gap between viewing zones. However, sample holograms made with a discretely segmented viewing zone teach us that as the viewing zone to viewing gap ratio is reduced the depth image does indeed becomes more sharply defined, though the cost for this is that the impression of depth is to some extent diminished. More particularly the parallax movement appears as multiplexed movement of surface elements potentially more susceptible to counterfeiting using dot-matrix and lithographic masking techniques.

Clearly depending on the desired balance between conventional continuous depth movement and image definition under extended light sources there will be an optimum number of viewing zones and an optimal zone to gap ratio determined by trial and evaluation.

Method for Providing a First Embodiment of Interrupted/Modulated Movement

Generating the discrete on/off movement effect illustrated in FIG. 17, can, within the context of classical H1/H2 holography, be provided most directly by masking the relevant H1 slit as shown in FIG. 20. This masking can be applied at either the H1 recording stage or later at the H2 transfer stage.

Figure 21:
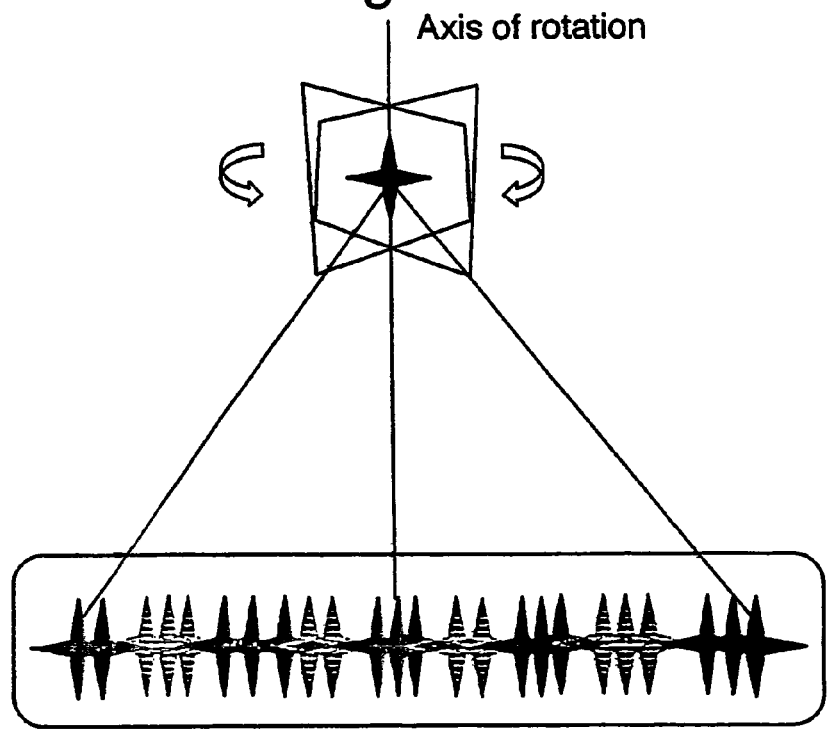
FIG. 21 illustrates the replay characteristics of yet a further device according to the invention.

However in addition to having discrete on/off viewing zones it is possible to retain continuous movement by significantly attenuating the brightness in the angular regions corresponding to void or gap zones—such that the depth image as it moves across the full angular viewing zone periodically appears bright and then dim but always remains visible. These replay characteristics are illustrated in FIG. 21. This interruption of the viewing zone will give replay characteristics intermediate between continuous uniform replay and the discrete segmented replay of FIG. 17. The degree of blur reduction will also be intermediate in its value or extent.

Figure 22:
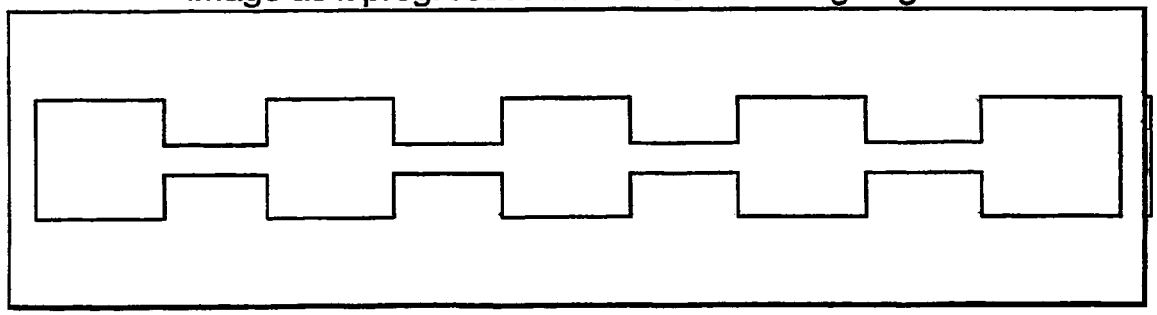
FIG. 22 illustrates a H1 mask for use in creating the device of FIG. 21.

This modulation of the "moving image" brightness can be shown by modifying the masking of the relevant H1 slit as shown in FIG. 22. Specifically we see that in the gaps or regions between the sectors providing full replay brightness, the H1 slit is this time, not completely blocked or masked, but rather its active width is significantly reduced.

Figure 23:
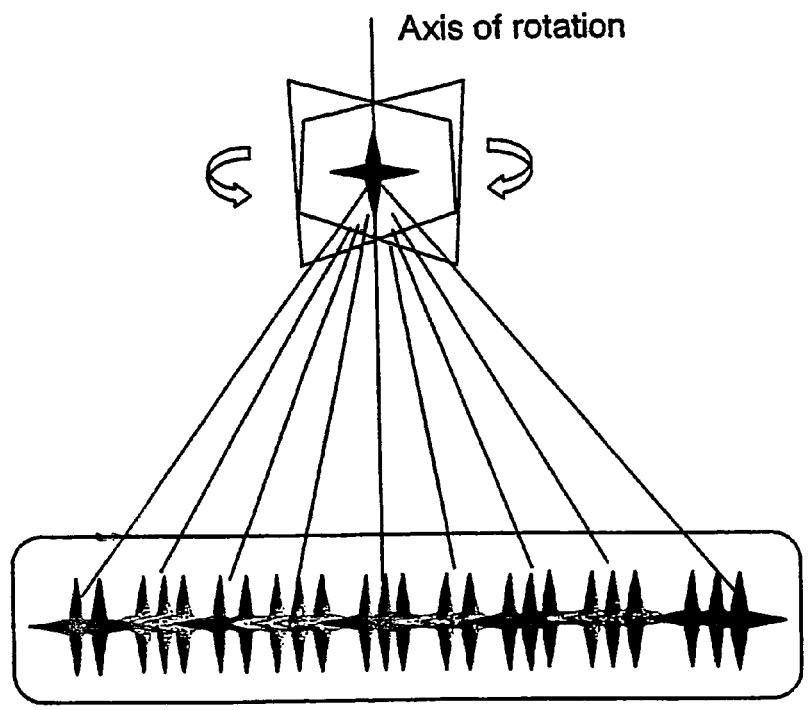
FIG. 23 illustrates the replay characteristics of a device according to the invention which exhibits a colour variation.

Other embodiments of the invention have the depth image alternately replaying in contrasting colours (orange-green) as it moves across the full angular viewing zone—the replay characteristics of such an OVD are as shown in FIG. 23.

Figure 24:
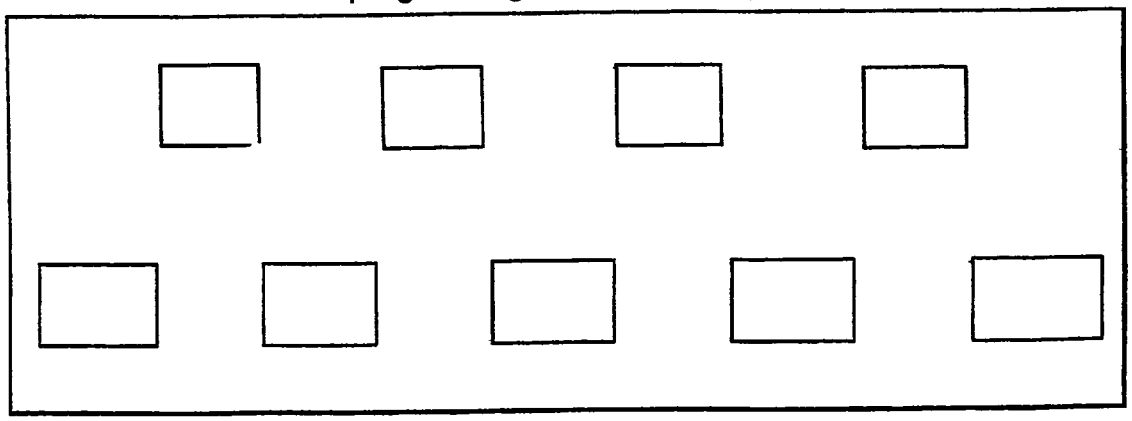
FIG. 24 illustrates a H1 mask for use in creating the device of FIG. 23.

This approach segments the microstructure footprint in two alternating microstructure sequences of differing pitches, which will have the effect of repeatedly partitioning the blur and reducing its visible effect to the extent of the preceding embodiment. This colour alternation in the "moving image" can be most directly provided by recording the moving image simultaneously or more preferably sequentially into two separate rainbow slits which are alternately masked as shown in FIG. 24.

FIG. 26 illustrates a number of examples of the invention which will be briefly described below. In each Figure, hashed areas show depth/parallax movement effects and solid shaded areas are positionally invariant.

Figure 26U:
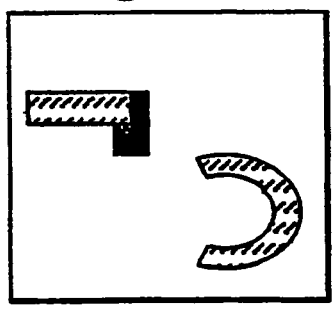
FIGS. 26A to 26V illustrate different examples of the invention.
Figure 26V:
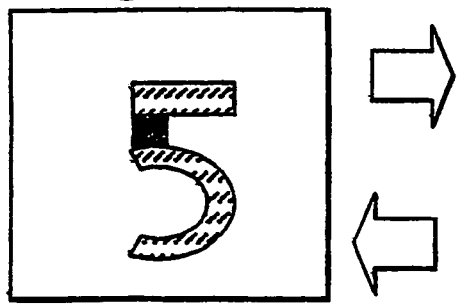
Figure 26A:
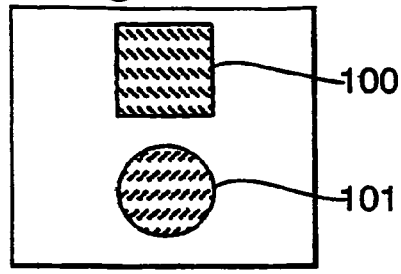

FIG. 26A illustrates the provision of at least two planes of holographic imagery 100,101. At least one plane will show forward or backward depth relative to the other.

Figure 26B:
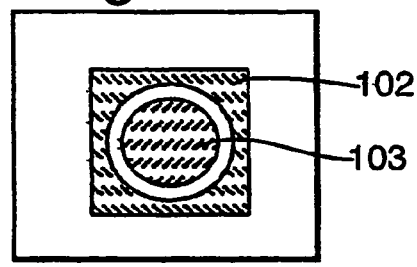

FIG. 26B illustrates an example of interaction between two planes of holographic imagery 102,103 in which there is a form of controlled positional geometry (registration) as a result of their associated motion parallax effects. Thus, image 103 can be centred within image 102.

Figure 26C:
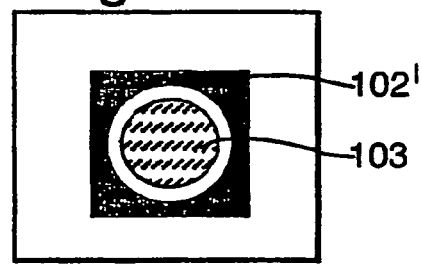

FIG. 26C is similar to FIG. 26B except that the holographic image 102' is now positionally invariant. This has the advantage that the image 102' is clearly viewable under all lighting conditions and is therefore optimized for providing optically recognisable graphical information.

Figure 26D:
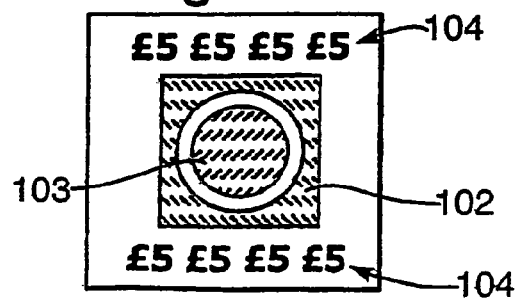

FIG. 26D shows a device similar to FIG. 26B but with the addition of further positionally invariant holographic imagery 104. The positionally invariant imagery may define other features such as multi-redundant holograms, information providing graphical indicia or apertures through to other planes of depth.

Figure 26E:
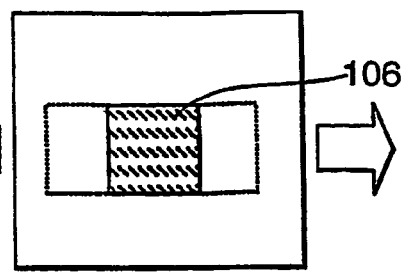
Figure 26F:
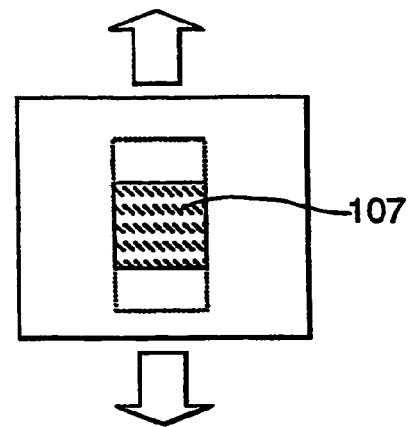

FIG. 26E illustrates a simple version of a device according to the invention in which a holographic image 106 exhibits horizontal movement (a single plane only being shown for clarity).

FIG. 26F again shows a single plane only with a holographic image 107 exhibiting vertical movement with a progressive colour change. It should be noted that this non-horizontal movement will require digital origination techniques.

Figure 26G:
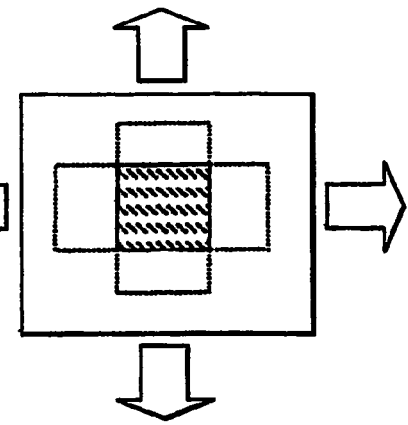

FIG. 26G illustrates a device which can exhibit horizontal and vertical movement and again a single plane only is shown for clarity.

Figure 26H:
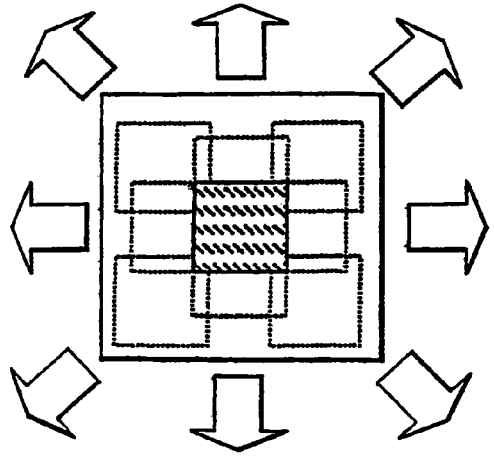

FIG. 26H illustrates how movement can be horizontal, vertical and even diagonal and again a single plane only is shown for clarity.

Figure 26I:
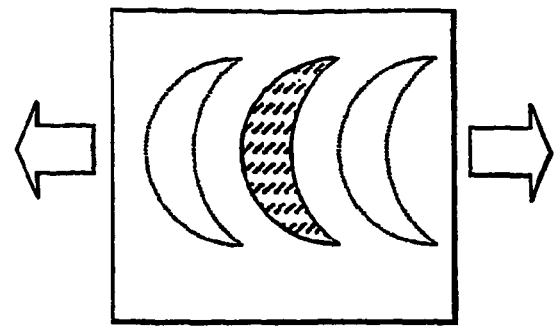
Figure 26J:
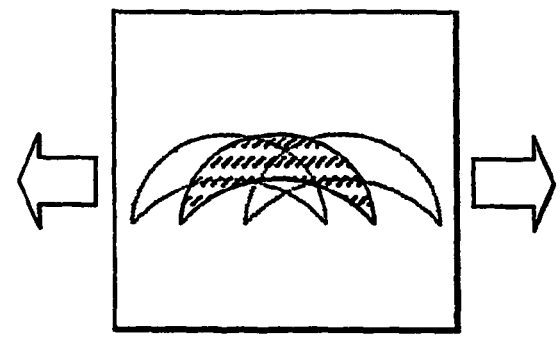

FIGS. 26I and 26J illustrate how rotation of the device may be used to switch movement channels or to turn movement channels on and off. Here the device is rotated by 90 degrees in a clockwise direction.

Figure 26K:
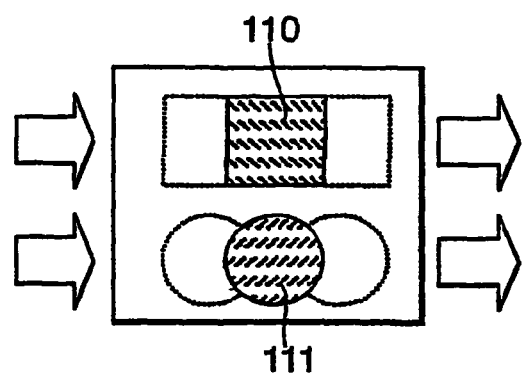

FIG. 26K illustrates how two (or more) holographic elements 110,111 may be co-directional. In this case, both image elements must be in the same forward or backward plane of depth.

Figure 26L:
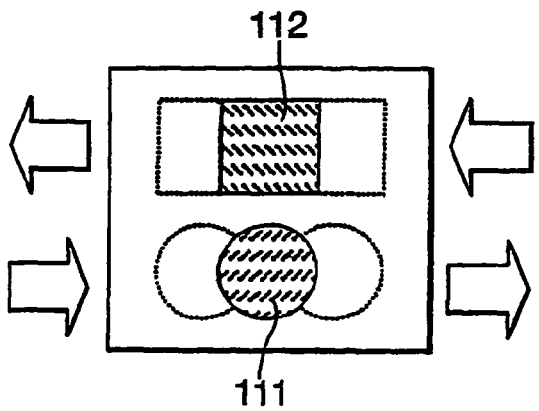

FIG. 26L illustrates how two (or more) elements 111,112 are formed in forward and backward planes respectively so as to exhibit a posed movement.

Figure 26M:
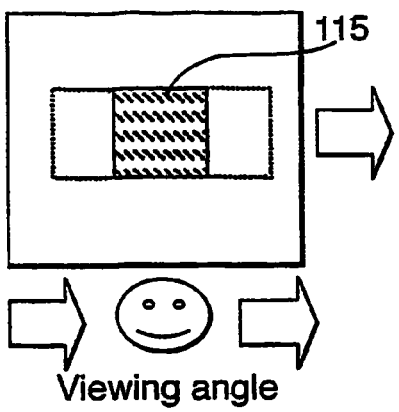

FIG. 26M illustrates for a single holographic image element how changing viewing angle causes apparent movement of the holographic image element 115. (Only a single plane is illustrated.) In this case, the image element is in the forward plane relative to the surface of the structure.

Figure 26N:
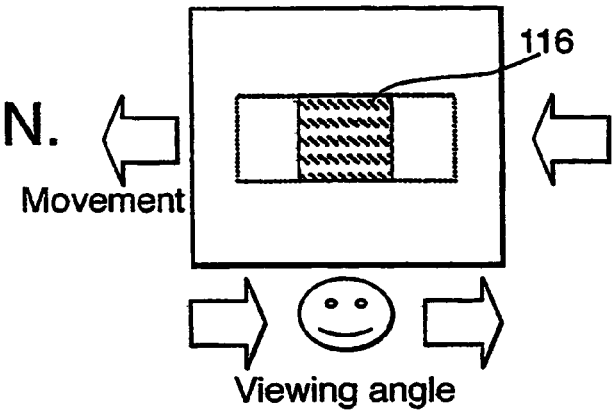

FIG. 26N illustrates an arrangement opposite to that shown in FIG. 26M in which the holographic image element 116 is formed in the rearward or backward plane thus exhibiting contrary movement.

Figure 26O:
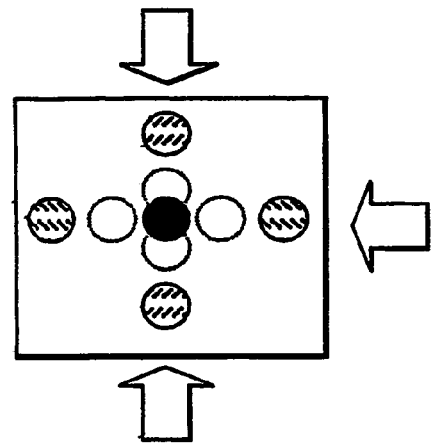

FIG. 26O illustrates how a single holographic image element can appear to move in several directions relative to a common reference point.

Figure 26P:
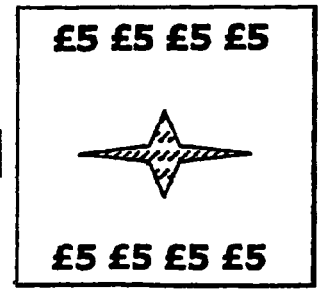

FIG. 26P illustrates that in order to optimise the design of the holographic image elements it is preferable to distort in the direction of movement. The star in FIG. 26P is distorted so the points in the direction of movement (east-west) are extended when compared to the points in the non-movement direction north-south). In this context, "distortion" refers to the image artwork and is different to blur which is a result of lighting conditions and substrate surface quality.

Figure 26Q:
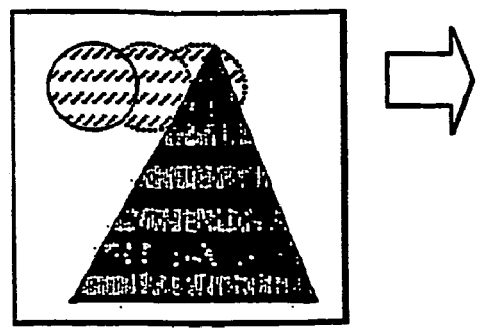
Figure 26R:
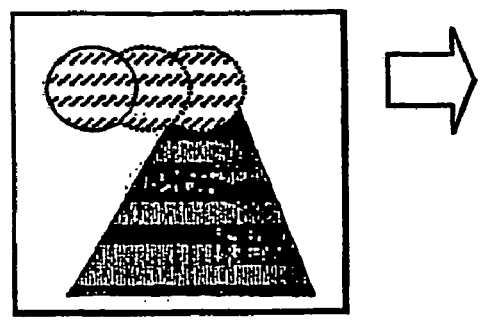
Figure 26S:
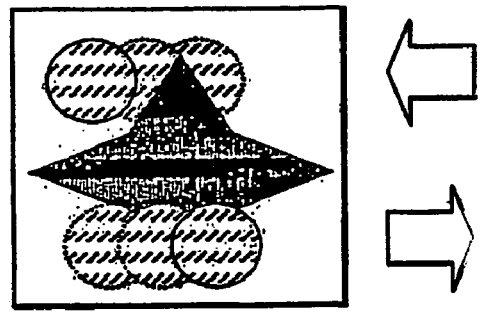

FIGS. 26Q, 26R and 26S illustrate how it is possible to create eclipsing effects which may be behind (26Q), in front (26R) or both (26S).

Figure 26T:
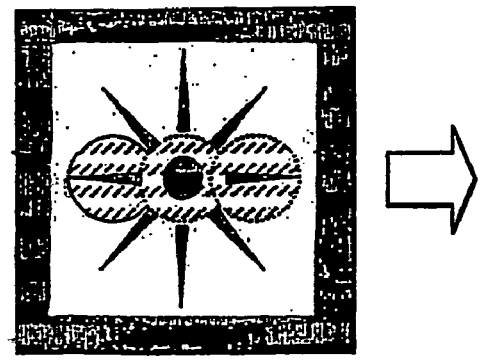
Figure 27:
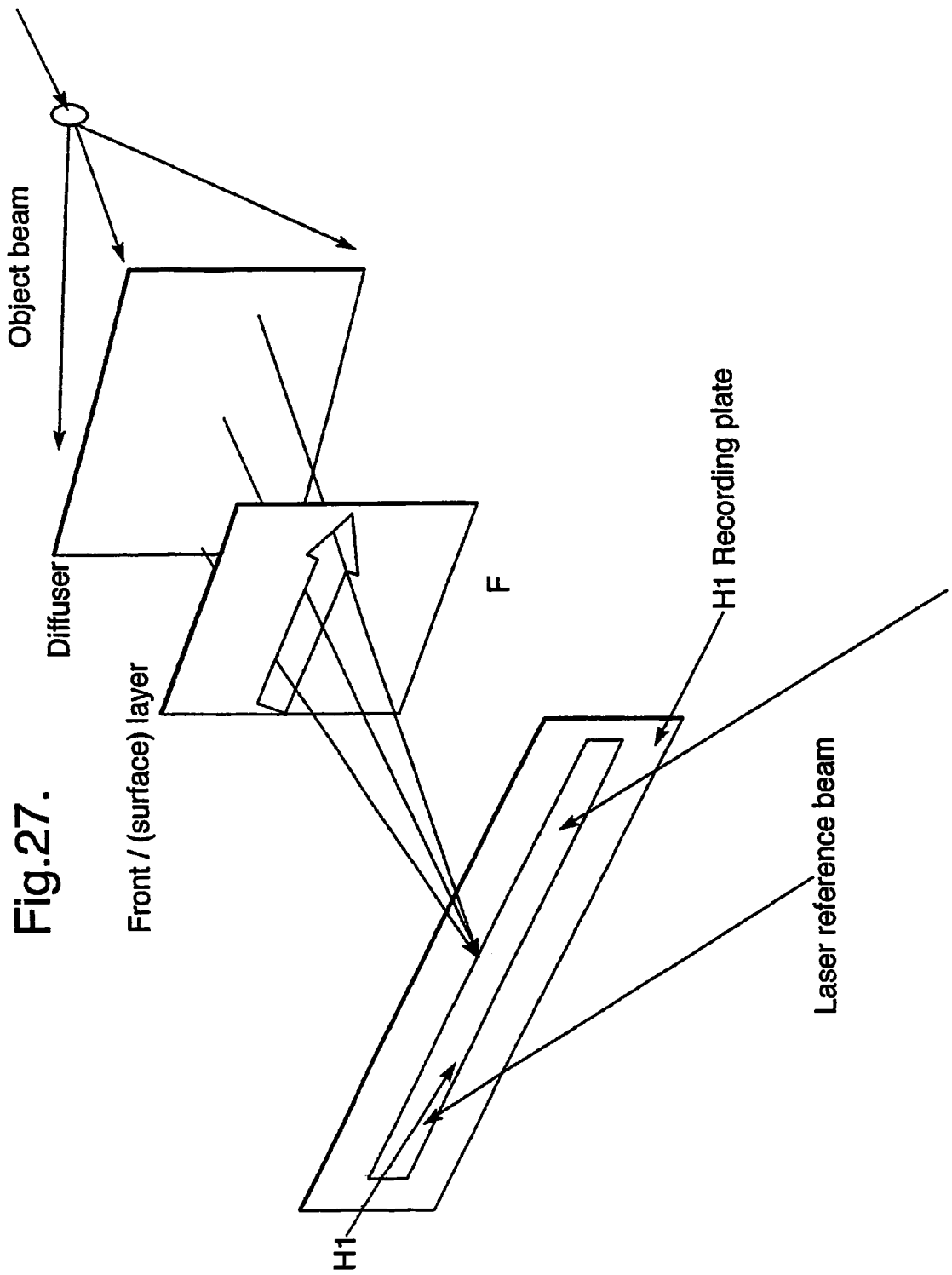
FIGS. 27 and 28 illustrate techniques for originating holograms based on the disclosures in US-A-2003/0151786A.
Figure 28:
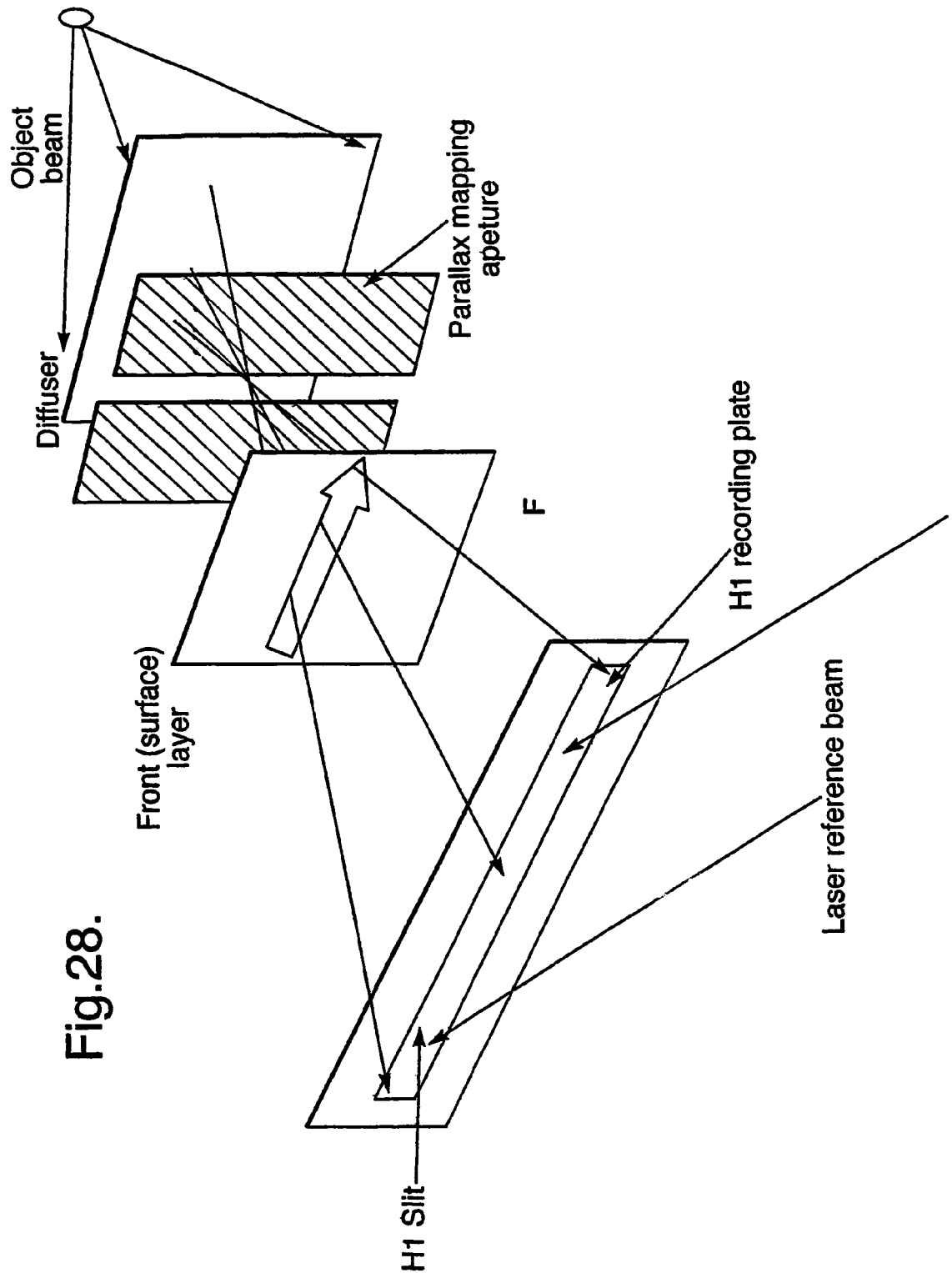

It is also possible for the movement element to be visualized through "windows" as illustrated in FIG. 26T.

FIG. 26T illustrates the concept of masking the moving holographic image elements with non-moving elements, which may also be holographic. Here a border and a central design are provided that are static (shown as dark elements). Additionally, a circular moving holographic image element is provided, shown in three sections illustrating a central view and the extreme left and right views. It can be seen that the movement element is intermittently masked and revealed by the non-movement element almost like a window. This information might be hidden and revealed by moving it from behind an opaque background, the information being revealed in a non-opaque window.

FIGS. 26U and 26V illustrate that where a combination of movement and positionally invariant elements are provided, these may be designed and arranged such that relative movement between them can result in the format of a recognisable symbol or image.

The Appendix compares the invention with volume holograms.

Appendix

Volume-reflection or Bragg Holograms

It should be appreciated that our analysis of the relationship between inter-planar separation ('depth'), parallax motion and image blur pertains only to surface relief holograms wherein "blur" manifests itself because the diffraction equation governing periodic surface relief phase and amplitude gratings does not impose strict angular or wavelength selectivity on the input or incident light.

However this analysis does not pertain to a class of holograms known as Volume Reflection Holograms which historically originated from a holographic recording technique developed by Yuri Denisyuk in the early 1960's shortly after the invention of the laser (see Ref Denisyuk, Yuri N., Optical Spectroscopy., Vol 15, 1963, pp. 279-284.).

Such holograms are recorded as a periodic refractive-index variation within the volume of the transparent recording material, typically a Silver-Halide (photographic) film/layer Di-Chromated Gelatin or a photopolymer. Specifically the recording material is placed within the coherent light interference pattern generated by a counter-propagating reference and object—the interference fringes typically being oriented more or less parallel to the plane of the material recording layer. A planar light interference pattern is thus recorded into the volume of the layer and through suitably processing converted into the periodic planes of refractive index variation. Typically there may be tens of such planes within the layer thickness with a mutual optical spacing which can shown to be (see Ref R. van Renesse, Optical Document Security, Second edition. Artech House publishers.)

$$t = \frac{\lambda}{2n\sin(90-r)}$$

where $\lambda$ is the recording wavelength, n the average refractive index and (90-r) the angle the two interfering make with their bisector. As a light wave passes through the hologram layer a fraction of its amplified gets successively reflected at each refractive-index modulated plane.

If the partial reflections off successive refractive-index modulated planes differ in optical path travelled through the medium by an integral number of wavelengths, then they will constructively interfere to provide a bright Holographic replay. In function the refractive index modulated (interference) planes with the volume of the Hologram are analogous to vacuum deposited metal oxide layers within an optical multi-layer stack.

The condition for constructive interference is $\lambda=2nt\cos(r)$ where r is the angle of incidence and reflection with respect to the interference generated refractive index planes and not the plane of the substrate. This is the well known Bragg interference condition (named after William Lawrence Bragg) and for this reason Volume holograms are sometimes referred to as Bragg holograms and the interference generated refractive index planes as Bragg Planes.

If we recognise that the angle that the two interfering beams make with their bisector is the compliment of the angle they make with the resultant interference planes i.e. sine(90-r)=cos (r) then we see that the Bragg condition is identical to the equation defining the inter-planar spacing.

Consequently if the volume hologram is illuminated with white light and the tilted such that its Bragg planes form the same angle with the light source as the original recording reference beam, then it will replay a monochromatic image of the original recording wavelength $\lambda$—i.e. the volume hologram is wavelength selective in respect of the illuminating light. The degree of selectivity increasing with the number of Bragg planes present within the volume hologram.

Similarly for a particular wavelength, if we consider an extended linear light source (equivalent to multiple point sources) the volume hologram will Bragg reflect only light which is incident from same angle as the original reference—i.e. the volume hologram is angle selective in respect of the illuminating light. Again the degree of selectivity increasing with number of Bragg planes. Now in polychromatic light, clearly a range of reflectance angles r and therefore incidence angles (as provided by an extended light source) can satisfy the Bragg condition—however overall the tendency towards wavelength and angle selection in respect of the incident illumination ensures that the for a given holographic depth and parallax displacement there will be significantly less blur evident within a volume hologram than a surface relief hologram, when viewed under non-point source lighting. In particular the expression we have derived from holographic point-image blur S, is specific to surface relief holograms and will not pertain.

In consideration of the above it would appear that if the clear visualisations of "depth" image elements or symbols under extended light sources was the only consideration then Volume or Bragg holograms and not surface relief holograms should be the dominant technology for high volume production and commercial application within the industry.

However this is not the case for a number of reasons: firstly the method of replicating Bragg Holograms namely optical or holographic contact copying, is intrinsically a much more expensive mass-production process than the embossing process used to replicate surface relief holograms.

Secondly the single layer volume holograms are essentially monochrome in their replay characteristics i.e. a particular image element within any volume hologram replays only one colour and doesn't exhibit the vivid rainbow colour changes that corresponding image elements within surface relief devices exhibit on vertical tilting. Volume holograms replaying 2 or 3 colours can either be fabricated by providing additional second and third recording layers (each layer recorded with a separate laser light of colour or wavelength close to the desired -replay colour firm that component layer). Or in the case of certain photopolymers by the spatially selective application of a diffusing monomer, following the holographic recording of the interference pattern, which alters the effective Bragg layer spacing but not the Bragg layer tilt. However in either case, the provision of additional colours significantly increases the replication unit and increasing the cost disparity with embossed holograms.

Thirdly there is a much greater diversity of holographic recording technology available today (optical and electron beam) which can be used to generate diffractive/holographic surface relief technology than for volume holography—which is essentially a variant of the classical Denisyuk holography technique. Also the principal material used for recording volume holograms for commercial and security applications is highly restricted and proprietary therefore limiting the providers such devices to only a couple of companies.

Finally the layer thickness required for volume holography (i.e. 10 micrometers or more) is much greater than that required to support a surface relief structure (one or two microns at most within a hot foil structure). The thickness of the Volume layer renders it resistant to the line-fracture that is necessary for hot-stamping or hot-foiling (especially if the layer is composed of a UV cured and cross-linked photopolymer). However in a one-two micrometer thick thermoplastic layer this line-fracture or edge-break, as defined by the perimeter of the hot-stamping die occurs readily under the action of heat and pressure.

Consequently volume holograms can only be applied as a pre died label (not by hot-foil transfer) to documents rendering them unsuitable for ultra high volume applications Also the thickness of the Volume Hologram (specially when composed of a cross-linked photo-polymer) renders insufficiently flexible for application to thin flexible (and easily crumpled) paper documents.

Therefore despite a volume or Bragg holograms technical advantages in respect of providing sharper better defined depth effects under non point source lighting, Diffractive/holographic surface devices still remain he dominant technology for high volume cost sensitive applications such as Banknotes, Travellers cheques, Financial cards etc. Hence the inventive teachings of this document focus on maximising the visual benefit of depth/parallax effects within diffractive surface relief optically variable devices with particular relevance to their application to the challenging substrate surface provided by paper security documents.

The invention claimed is:

1. A security device comprising:
a surface relief microstructure which, in response to incident radiation, replays a hologram viewable within a viewing zone, the hologram comprising:
at least a first holographic image element in an image plane spaced from the surface of the microstructure, the device exhibiting at least one further image in a plane spaced from said image plane of the first holographic image element, wherein
the spacing between the first holographic image element image plane and the plane of the at least one further image is such that, on tilting the device through a maximum viewing angle of 45°, the first holographic image element exhibits an apparent rate of movement relative to the at least one further image, the rate of movement being at least 6 mm per radian of tilt, and the product of the rate of movement and an included angle of the viewing zone defining a distance at least 18% of a dimension of the device in the parallax direction.

2. A device according to claim 1, wherein the at least one further image is substantially spatially invariant relative to the device.

3. A device according to claim 2, wherein movement of the first holographic image element causes the first holographic image element to overlap the at least one further image.

4. A device according to claim 2, wherein the at least one further image is non-holographic.

5. A device according to claim 1, wherein the hologram defines at least one second holographic image elements.

6. A device according to claim 1, wherein the plane of the at least one further image is substantially coincident with the plane of the surface relief microstructure.

7. A device according to claim 5, wherein the at least one first holographic image element and the at least one second holographic image element are formed in planes respectively in front of and behind the plane of the surface relief microstructure.

8. A device according to claim 1, wherein the surface relief microstructure replays at least one of the first holographic image element and the second holographic element into a set of discrete, angularly spaced subsidiary viewing zones.

9. A device according to claim 8, wherein the at least one of the first holographic image element and the second holographic image element is not visible in spaces between the subsidiary viewing zones.

10. A device according to claim 8, wherein the subsidiary viewing zones are substantially equally spaced apart.

11. A device according to claim 9, wherein the viewing zones and the spaces between the viewing zones have substantially the same angular extent.

12. A device according to claim 1, wherein at least one of the first holographic image element and the second holographic image element have a dimension of at least 3 mm in the parallax direction.

13. A device according to claim 1, wherein at least one of the holographic image elements exhibits a color variation as it moves.

14. A device according to claim 1, wherein the first holographic image element defines a symbol.

15. A device according to claim 1, wherein the at least one further image defines a symbol.

16. A device according to claim 14, wherein the symbol comprises a shape having a visual meaning, association or resonance with an observer.

17. A device according to claim 1, wherein the first holographic image and the at least one further image are movable in relation to each other to form a recognizable symbol.

18. A device according to claim 1, wherein the product of the rate of movement and the included angle of the viewing zone define a distance of at least 18.6% of the dimension of the device in the parallax direction.

19. A device according to claim 1, wherein the included angle of the viewing zone is no greater than 1 radian and the size of the device in the parallax direction is less than 5 times an interplane distance.

20. An article carrying a security device according to claim 1.

21. An article according to claim 20, wherein the article comprises paper.

22. An article according to claim 20, wherein the article comprises a banknote.

23. An article according to claim 20, wherein the article is selected from the group consisting of a check, voucher, certificate of authenticity, stamp, brand protection article and fiscal stamp.

* * * * *